United States Patent
Park et al.

(10) Patent No.: US 9,721,113 B2
(45) Date of Patent: Aug. 1, 2017

(54) HOST CONTROLLER AND SYSTEM-ON-CHIP

(71) Applicant: SAMSUNG ELECTRONICS CO., LTD., Suwon-si, Gyeonggi-Do (KR)

(72) Inventors: Ju-Hee Park, Seoul (KR); Seok-Min Park, Suwon-si (KR); Dong-Jin Park, Seoul (KR); Heon-Soo Lee, Hwaseong-si (KR); Hong-Mook Choi, Bucheon-si (KR); Sang-Hyun Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1 day.

(21) Appl. No.: 14/657,006

(22) Filed: Mar. 13, 2015

(65) Prior Publication Data

US 2015/0371055 A1   Dec. 24, 2015

(30) Foreign Application Priority Data

Jun. 19, 2014   (KR) .................. 10-2014-0075099

(51) Int. Cl.
- H04L 29/06 (2006.01)
- G06F 21/62 (2013.01)
- G06F 21/72 (2013.01)
- G06F 21/80 (2013.01)
- G06F 21/85 (2013.01)

(52) U.S. Cl.
CPC .......... G06F 21/6218 (2013.01); G06F 21/72 (2013.01); G06F 21/805 (2013.01); G06F 21/85 (2013.01); G06F 2221/2107 (2013.01)

(58) Field of Classification Search
None
See application file for complete search history.

(56) References Cited

U.S. PATENT DOCUMENTS

| | | | |
|---|---|---|---|
| 7,689,837 B2 | 3/2010 | Taguchi et al. | |
| 7,925,017 B2 | 4/2011 | Shirai et al. | |
| 8,230,207 B2 | 7/2012 | Iyer et al. | |
| 8,321,659 B2 | 11/2012 | Haneda | |
| 8,341,430 B2 | 12/2012 | Ureche et al. | |
| 8,621,214 B2* | 12/2013 | Johnson | G06F 21/62 370/352 |
| 9,177,160 B1* | 11/2015 | Farquhar | H04L 63/0853 |
| 2003/0023846 A1* | 1/2003 | Krishna | G06F 9/3879 713/162 |
| 2006/0047975 A1* | 3/2006 | Beukema | H04L 9/00 713/193 |

(Continued)

FOREIGN PATENT DOCUMENTS

| | | |
|---|---|---|
| JP | 4213704 B | 11/2008 |
| JP | KR 0874872 B1 | 12/2008 |

(Continued)

*Primary Examiner* — Maung Lwin
(74) *Attorney, Agent, or Firm* — Volentine & Whitt, PLLC

(57) ABSTRACT

A host controller that controls a storage device includes an encryption unit that is selectively configured in response to file encryption information and disk encryption information to encrypt data. The encryption unit encrypts the data using a file encryption operation based on the file encryption information and/or a disk encryption operation based on the disk encryption information.

17 Claims, 16 Drawing Sheets

(56) References Cited

U.S. PATENT DOCUMENTS

| | | | | |
|---|---|---|---|---|
| 2006/0193470 A1* | 8/2006 | Williams | ............ | H04L 9/0894 380/259 |
| 2009/0316899 A1* | 12/2009 | Kim | ............ | H04L 9/0637 380/255 |
| 2010/0153747 A1* | 6/2010 | Asnaashari | ............ | H04L 9/28 713/193 |
| 2011/0072276 A1* | 3/2011 | Lee | ............ | G06F 21/80 713/189 |
| 2012/0036358 A1* | 2/2012 | Johnson | ............ | G06F 21/62 713/168 |
| 2012/0151219 A1 | 6/2012 | Ryu et al. | | |
| 2014/0281545 A1* | 9/2014 | Erofeev | ............ | G06F 21/6218 713/171 |
| 2014/0310536 A1* | 10/2014 | Shacham | ............ | G06F 21/78 713/193 |
| 2015/0040235 A1* | 2/2015 | Byrne | ............ | H04L 63/0457 726/26 |
| 2015/0121089 A1* | 4/2015 | Kirikova | ............ | G06F 21/6218 713/193 |
| 2015/0188946 A1* | 7/2015 | Zaitsev | ............ | H04L 63/20 726/1 |

FOREIGN PATENT DOCUMENTS

| | | |
|---|---|---|
| JP | 4463320 B | 2/2010 |
| JP | 4505717 B | 5/2010 |
| JP | 2012-084043 A | 4/2012 |
| KR | 2005-0002103 A | 1/2006 |

\* cited by examiner

| | | | | | | |
|---|---|---|---|---|---|---|
| DW0 | DATA BASE ADDRESS | | | | 0 | 0 |
| DW1 | DATA BASE ADDRESS UPPER 32-BITS | | | | | |
| DW2 | RESERVED | | | | | |
| DW3 | DAS | FAS | DKL | FKL | RESERVED | DATA BYTE COUNT | 1 | 1 |
| DW4 | FILE IV [31:0] | | | | | |
| DW5 | FILE IV [63:32] | | | | | |
| DW6 | FILE IV [95:64] | | | | | |
| DW7 | FILE IV [127:96] | | | | | |
| DW8 | FILE ENCRYPTION KEY [31:0] | | | | | |
| DW9 | FILE ENCRYPTION KEY [63:32] | | | | | |
| DW10 | FILE ENCRYPTION KEY [95:64] | | | | | |
| DW11 | FILE ENCRYPTION KEY [127:96] | | | | | |
| DW12 | FILE ENCRYPTION KEY [159:128] | | | | | |
| DW13 | FILE ENCRYPTION KEY [191:160] | | | | | |
| DW14 | FILE ENCRYPTION KEY [223:192] | | | | | |
| DW15 | FILE ENCRYPTION KEY [225:224] | | | | | |
| DW16 | FILE TWEAK KEY [31:0] | | | | | |
| DW17 | FILE TWEAK KEY [63:32] | | | | | |
| DW18 | FILE TWEAK KEY [95:64] | | | | | |
| DW19 | FILE TWEAK KEY [127:96] | | | | | |
| DW20 | FILE TWEAK KEY [159:128] | | | | | |
| DW21 | FILE TWEAK KEY [191:160] | | | | | |
| DW22 | FILE TWEAK KEY [223:192] | | | | | |
| DW23 | FILE TWEAK KEY [255:224] | | | | | |
| DW24 | DISK IV [31:0] | | | | | |
| DW25 | DISK IV [63:32] | | | | | |
| DW26 | DISK IV [95:64] | | | | | |
| DW27 | DISK IV [127:96] | | | | | |
| DW28 | RESERVED | | | | | |
| DW29 | RESERVED | | | | | |
| DW30 | RESERVED | | | | | |
| DW31 | RESERVED | | | | | |

DAS : DISK ALGORITHM SELECTOR [1:0] (2'B00:CLEAR, 2'B01:AES CBC, 2'B10:AES XTS)
FAS : FILE ALGORITHM SELECTOR [:0] (2'B00:CLEAR, 2'B01:AES CBC, 2'B10:AES XTS)
DKL : DISK KEY LENGTH (0:128BIT KEY, 1:256BIT KRY)
FKL : FILE KEY LENGTH (0:128BIT KEY, 1:256BIT KEY)

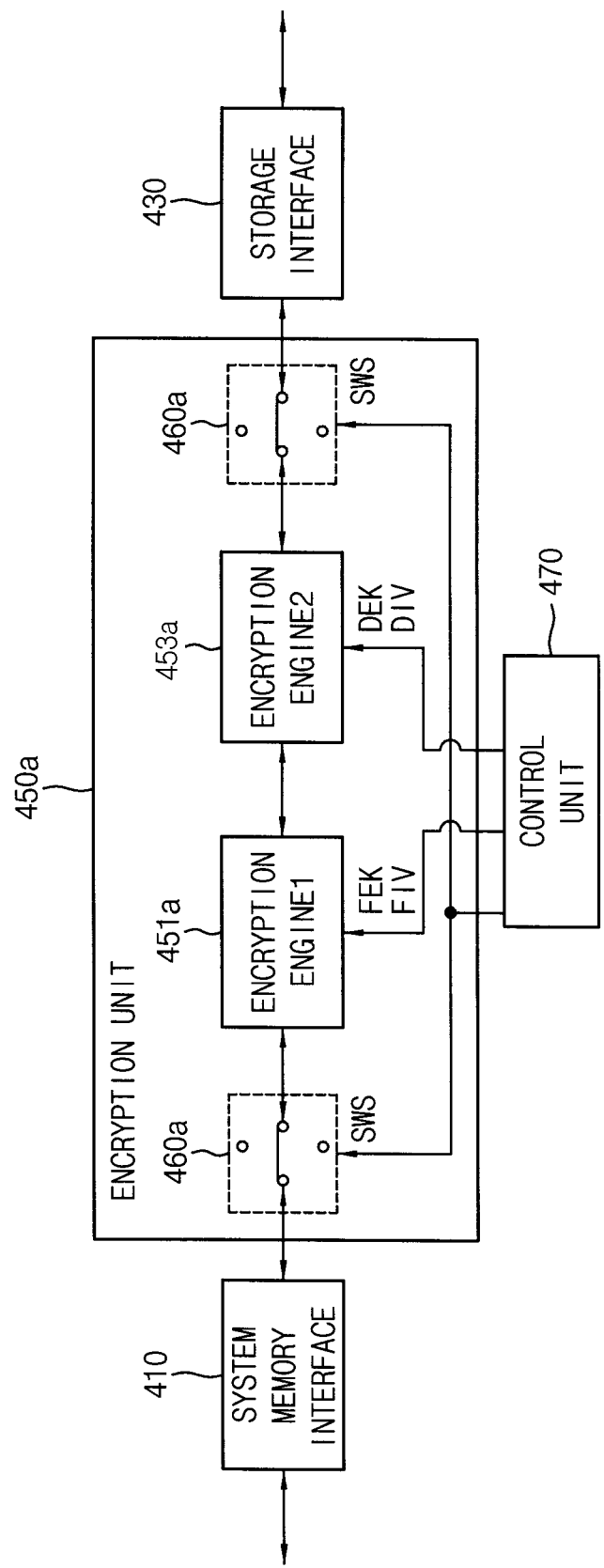

HOST CONTROLLER AND SYSTEM-ON-CHIP

CROSS-REFERENCE TO RELATED APPLICATIONS

This U.S. non-provisional application claims priority under 35 U.S.C. §119 to Korean Patent Application No. 10-2014-0075099 filed on Jun. 19, 2014, the subject matter of which is hereby incorporated by reference.

BACKGROUND

The inventive concept relates generally to semiconductor devices. More particularly, the inventive concept relates to host controllers that control storage devices, and system-on-chips including the host controllers.

A storage device such as a universal flash storage (UFS), memory card, solid stage drive (SSD), hard disk drive (HDD), etc., may be used as a secondary memory in a variety of computational systems such as a computer, smart phone, etc., to store data. Any of these storage devices will be attachable/detachable with respect to the computational system. Accordingly, once the storage device in its attached state has been used to store data generated by a first computational system, it may be detached from the first computational system and then reattached to a second computational system. In this manner, the second computational system may access data generated by the first computational system via the portable storage device.

However, this data portability comes at the price of increased data security threat. That is, the storage device may be lost or stolen, and the stored data may be accessed by unauthorized persons or computational systems.

SUMMARY

Certain embodiments of the inventive concept provide a host controller having strengthened security capabilities, while other embodiments provide a system-on-chip (SoC) including a host controller having strengthened security capabilities.

According to certain embodiments of the inventive concept, a host controller that controls a storage device includes a system memory interface configured to communicate with a system memory, a storage interface configured to communicate with a storage device, an encryption unit configured to encrypt data that are written from the system memory to the storage device, and a control unit configured to extract file encryption information and disk encryption information from a command by analyzing the command provided by a processor, to control the encryption unit to selectively perform a file encryption operation based on the file encryption information, and to further control the encryption unit to selectively perform a disk encryption operation based on the disk encryption information.

In some embodiments, the control unit may control the encryption unit to perform no encryption operation for the data when the file encryption information indicates that the file encryption operation is not to be performed and the disk encryption information indicates that the disk encryption operation is not to be performed, may control the encryption unit to perform the file encryption operation for the data when the file encryption information indicates that the file encryption operation is to be performed and the disk encryption information indicates that the disk encryption operation is not to be performed, may control the encryption unit to perform the disk encryption operation for the data when the file encryption information indicates that the file encryption operation is not to be performed and the disk encryption information indicates that the disk encryption operation is to be performed, and may control the encryption unit to sequentially perform the file encryption operation and the disk encryption operation for the data when the file encryption information indicates that the file encryption operation is to be performed and the disk encryption information indicates that the disk encryption operation is to be performed.

In some embodiments, the command may include a physical region description table (PRDT) representing information about the data stored in the system memory.

In some embodiments, the physical region description table may include a data bass address field representing an address of the data in the system memory, a data byte count field representing the number of bytes of the data, a disk algorithm selector field representing whether the disk encryption operation is to be performed or not to be performed as the disk encryption information, and a file algorithm selector field representing whether the file encryption operation is to be performed or not to be performed as the file encryption information.

In some embodiments, the disk algorithm selector field may further represent a type of an encryption algorithm used in the disk encryption operation, and the file algorithm selector field may further represent a type of an encryption algorithm used in the file encryption operation.

In some embodiments, the physical region description table may further include, as the disk encryption information, a disk key length (DKL) field representing a length of an encryption key used in the disk encryption operation, and a disk initialization vector (Disk IV) field representing an initialization vector used in the disk encryption operation.

In some embodiments, the physical region description table may further include, as the file encryption information, a file key length (FKL) field representing a length of an encryption key used in the file encryption operation, a file initialization vector (File IV) field representing an initialization vector used in the file encryption operation, a file encryption key field representing an encryption key used in the file encryption operation, and a file tweak key field representing a tweak key used in the file encryption operation.

In some embodiments, the encryption unit may include a first encryption engine configured to perform the file encryption operation or the disk encryption operation, a second encryption engine configured to perform the file encryption operation or the disk encryption operation, and a data path forming unit configured to form a data path between the system memory interface and the storage interface.

In some embodiments, when the file encryption information indicates that the file encryption operation is to be performed and the disk encryption information indicates that the disk encryption operation is to be performed, the control unit may controls the first encryption engine to perform the file encryption operation, may controls the second encryption engine to perform the disk encryption operation, and may control the data path forming unit to form the data path from the system memory interface through the first encryption engine and the second encryption engine to the storage interface such that the data provided from the system memory sequentially pass the first encryption engine and the second encryption engine.

In some embodiments, the data sequentially passing the first encryption engine and the second encryption engine may be stored in the storage device via the storage interface. When the data are read from the storage device, the control unit may control the data path forming unit to form the data path from the storage interface through the second encryption engine and the first encryption engine to the system memory interface such that the data read from the storage device sequentially pass the second encryption engine and the first encryption engine.

In some embodiments, when the file encryption information indicates that the file encryption operation is to be performed and the disk encryption information indicates that the disk encryption operation is not to be performed, the control unit may control the first encryption engine to perform the file encryption operation, may control the second encryption engine to perform the file encryption operation, and may control the data path forming unit such that the first encryption engine and the second encryption engine are connected in parallel with each other between the system memory interface and the storage interface.

In some embodiments, when the file encryption operation is not to be performed and the disk encryption information indicates that the disk encryption operation is to be performed, the control unit may control the first encryption engine to perform the disk encryption operation, may control the second encryption engine to perform the disk encryption operation, and may control the data path forming unit such that the first encryption engine and the second encryption engine are connected in parallel with each other between the system memory interface and the storage interface.

In some embodiments, when the file encryption operation is not to be performed and the disk encryption information indicates that the disk encryption operation is not to be performed, the control unit may control the data path forming unit such that the data bypass the first and second encryption engines by connecting the system memory interface and the storage interface.

In some embodiments, the encryption unit may include an encryption engine configured to perform the file encryption operation or the disk encryption operation, a buffer unit configured to temporarily store the data encrypted by the encryption engine, and a data path forming unit configured to form a data path between the system memory interface and the storage interface.

In some embodiments, when the file encryption information indicates that the file encryption operation is to be performed and the disk encryption information indicates that the disk encryption operation is to be performed, the control unit may control the encryption engine to perform the file encryption operation during a first time period, may controls the data path forming unit to form the data path from the system memory interface through the encryption engine to the buffer unit during the first time period such that the data provided from the system memory pass the encryption engine and are stored in the buffer unit, may control the encryption engine to perform the disk encryption operation during a second time period after the first time period, and may control the data path forming unit to form the data path from the buffer unit through the encryption engine to the storage interface during the second time period such that the data stored in the buffer unit again pass the encryption engine and are provided to the storage device.

In some embodiments, the encryption unit may include a first encryption engine configured to perform the file encryption operation or the disk encryption operation, a second encryption engine configured to perform the file encryption operation or the disk encryption operation, a third encryption engine configured to perform the file encryption operation or the disk encryption operation, a fourth encryption engine configured to perform the file encryption operation or the disk encryption operation, and a data path forming unit configured to form a data path between the system memory interface and the storage interface.

In some embodiments, when the file encryption information indicates that the file encryption operation is to be performed and the disk encryption information indicates that the disk encryption operation is to be performed, the control unit may control the first and third encryption engines to perform the file encryption operation, may control the second and fourth encryption engines to perform the disk encryption operation, and may control the data path forming unit to form a first data path where the first and second encryption engines are connected in series between the system memory interface and the storage interface, and to form a second data path where the third and fourth encryption engines are connected in series between the system memory interface and the storage interface.

In some embodiments, when the file encryption information indicates that the file encryption operation is to be performed and the disk encryption information indicates that the disk encryption operation is not to be performed, the control unit may control the first through fourth encryption engines to perform the file encryption operation, and may control the data path forming unit such that the first through fourth encryption engines are connected in parallel with each other between the system memory interface and the storage interface.

According to certain embodiments of the inventive concept, a system-on-chip includes at least one processor, and a host controller configured to control a storage device. The host controller includes a system memory interface configured to communicate with a system memory, a storage interface configured to communicate with a storage device, an encryption unit configured to encrypt data that are written from the system memory to the storage device, and a control unit configured to extract file encryption information and disk encryption information from a command by analyzing the command provided by the processor, to control the encryption unit to selectively perform a file encryption operation based on the file encryption information, and to further control the encryption unit to selectively perform a disk encryption operation based on the disk encryption information.

In some embodiments, the storage device will be a universal flash storage (UFS), a memory card, a solid state drive (SSD) or a hard disk drive (HDD).

BRIEF DESCRIPTION OF THE DRAWINGS

Certain embodiments are illustrated in the accompanying drawings and should be considered in relation to the following written description.

FIG. 8 is a diagram illustrating an example of a physical region description table (PRDT) including file encryption information and disk encryption information.

FIGS. 9A through 9D are diagrams for describing examples of operations of a host controller of FIG. 6.

DETAILED DESCRIPTION

Certain embodiments of the inventive concept will now be described in some additional detail with reference to the accompanying drawings. The inventive concept may, however, be embodied in many different forms and should not be construed as being limited to only the illustrated embodiments. Throughout the written description and drawings like reference numbers and labels denote like or similar elements or features.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
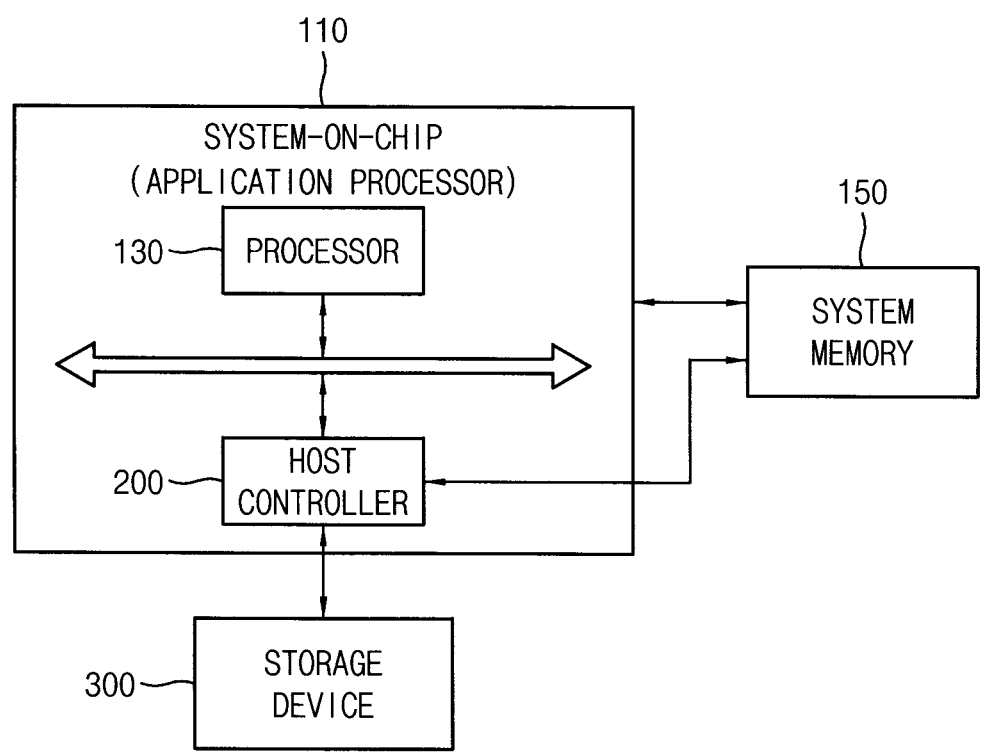
FIG. 1 is a block diagram illustrating a computational system including a system-on-chip according to example embodiments.
Figure 2:
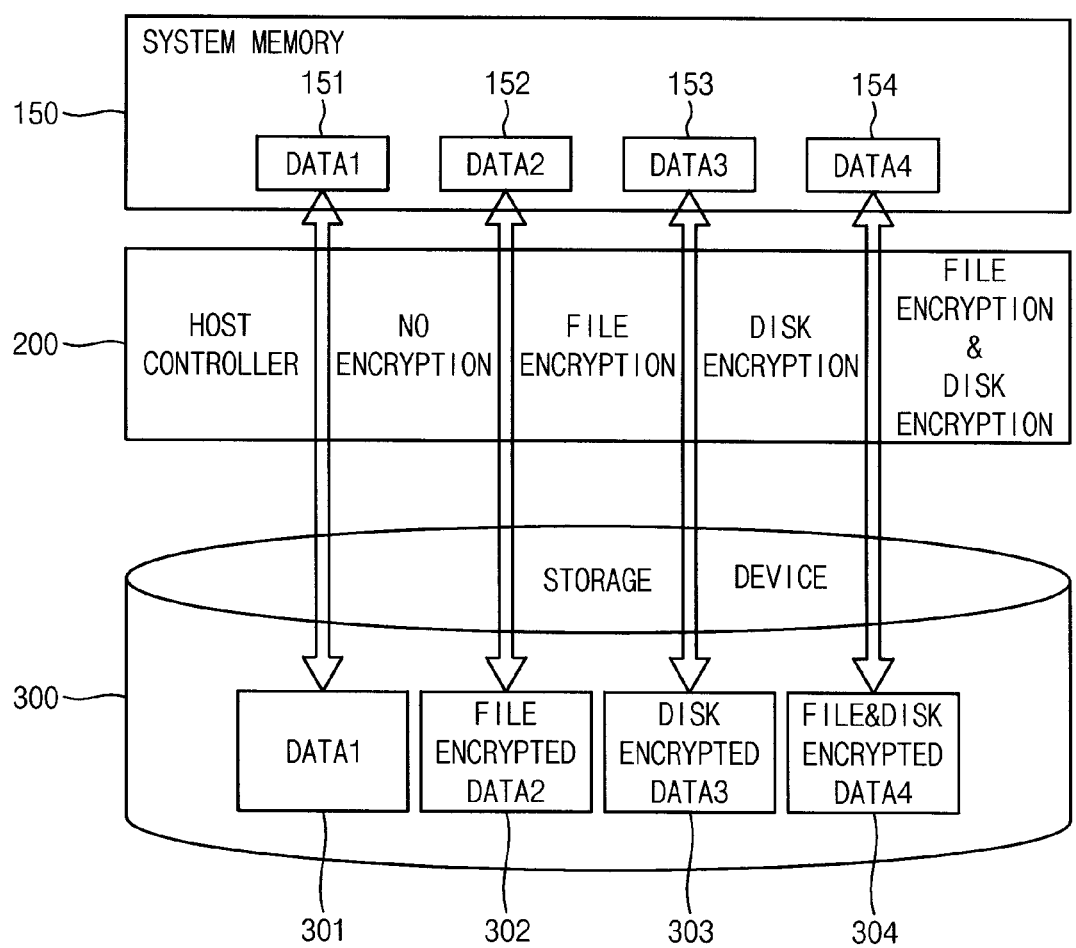
FIG. 2 is a diagram for describing examples of an encryption operation performed by a host controller according to example embodiments.
Figure 3:
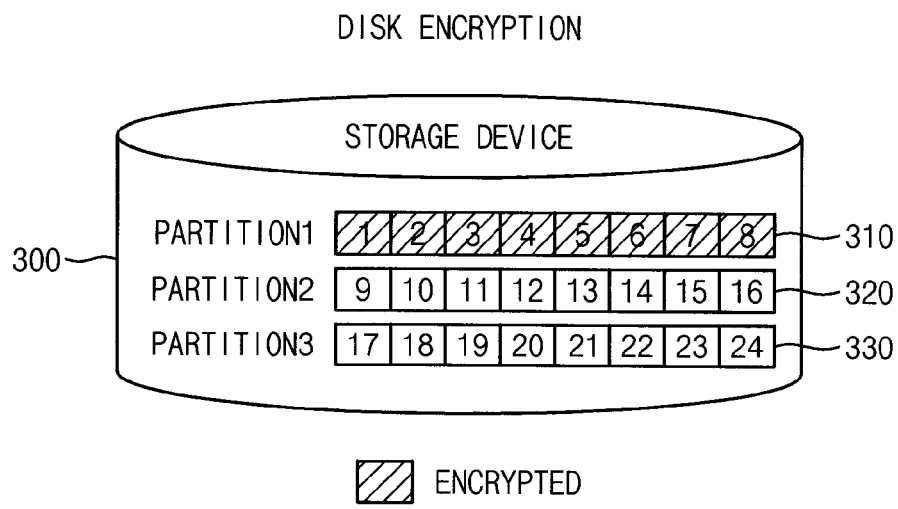
FIG. 3 is a diagram for describing a disk encryption operation performed by a host controller according to example embodiments.
Figure 4:
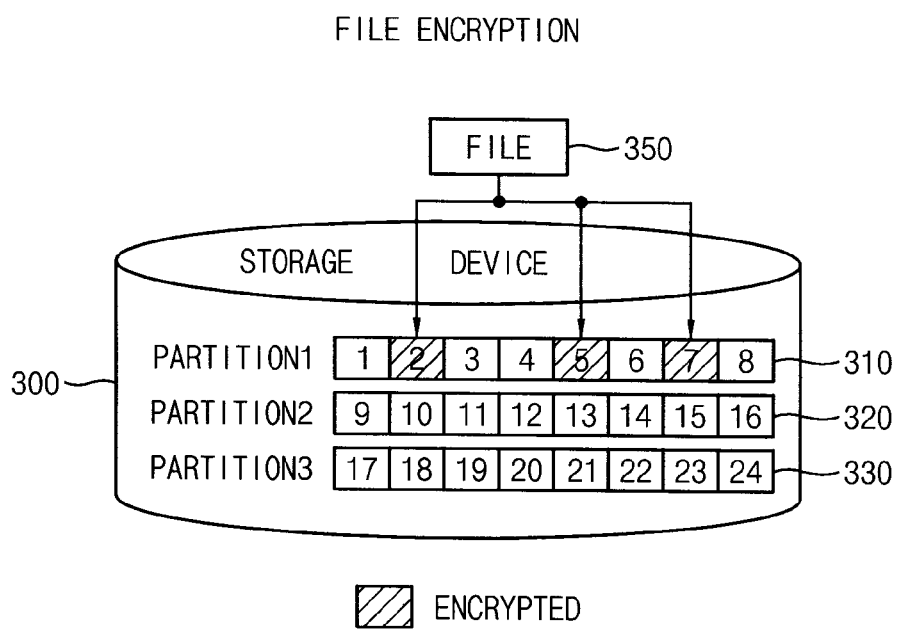
FIG. 4 is a diagram for describing a file encryption operation performed by a host controller according to example embodiments.

FIG. 1 is a block diagram illustrating a computational system including a system-on-chip according to certain embodiments of the inventive concept. FIG. 2 is a conceptual diagram further illustrating in one example an encryption operation that may be performed by the host controller of FIG. 1. FIG. 3 is a related conceptual diagram further illustrating a disk encryption operation that may be performed by the host controller of FIG. 1, and FIG. 4 is a conceptual diagram further illustrating a file encryption operation that may be performed by the host controller of FIG. 1.

Referring to FIG. 1, a computational system 100 includes a system-on-chip (SoC) 110 including a processor 130, a system memory 150 and a storage device 300 attached to the computational system 100. The computational system 100 may be any one of a number of computational system types including a mobile phone, smart phone, personal computer, desktop computer, laptop computer, tablet computer, server computer, workstation, music player, personal digital assistants (PDA), portable multimedia player (PMP), digital television, digital camera, portable game console, navigation system, etc.

The SoC 110 may be used to control the various operations executed by the computational system 100. Here, the SoC 110 may be an application processor (AP), mobile SoC, multimedia SoC, an application-specific integrated circuit (ASIC), or the like. In the illustrated example of FIG. 1, the SoC 110 includes the processor 130 (e.g., a central processing unit (CPU) or microprocessor) and a host controller 200 configured to control the operation of the storage device 300. Those skilled in the art will appreciate that the SoC 110 may further include a memory unit, a power management unit, one or more input/output (I/O) interface(s), as well as related bus(es), etc.

The processor 130 may be used to control the overall operation of the SoC 110, and may be coupled to the system memory 150. With this configuration, the processor 130 may be used to read data from the system memory 150, and/or write data to the system memory 150. Further, the processor 130 may be used to provide one or more command(s) to the host controller 200, where the host controller 200 controls the storage device 300 in response to the one or more command(s) provided from the processor 130.

The system memory 150 may be a main memory of the computational system 100, and may be used to store data (e.g., programming code) required for operation of the computational system 100. For example, the system memory 150 may be implemented using volatile memory, such as dynamic random access memory (DRAM), static random access memory (SRAM), mobile DRAM, dual data rate (DDR) synchronous dynamic random access memory (SDRAM), low power DDR SDRAM, graphics DDR SDRAM, Rambus DRAM, etc.

Alternately or additionally, the storage device 300 may be used as a secondary memory of the computational system 100. That is, the storage device 300 may be used to store data generated or processed by the computational system 100, or "write data" provided to the computational system 100. In certain embodiments of the inventive concept, the storage device 300 may configured as an attachable/detachable storage device with respect to the computational system 100. The storage device 300 may be variously provide as a universal flash storage (UFS), memory card, solid stage drive (SSD), hard disk drive (HDD), etc.

As previously noted, the host controller 200 may control the storage device 300 in response to a sequence of command(s) provided by the processor 130. For example, in response to the command(s), the host controller 200 may cause write data to be stored in the storage device 300, or may cause designated "read data" to be retrieved from the storage device 300. (Hereafter, for clarity and brevity of description, one or more commands and/or a sequence of related commands will generally be referred to as "the command", bearing in mind that many different approaches may be taken to the definition of the command).

In certain embodiments, the processor 130 may be used to store the command in the system memory 150, and the host controller 200 may thereafter be "indirectly" provided with the command by reading the command from the system memory 150. In other embodiments, the processor 130 may be used to "directly" provide the command to the host controller 200 via an internal bus of the SoC 110.

When writing data to the storage device 300 (i.e., during a data write operation), the host controller 200 may be used to selectively perform either a file encryption operation and/or a disk encryption operation on received write data. For example, the host controller 200 may extract file encryption information and disk encryption information from the command by analyzing the command provided by the processor 130, may selectively perform the file encryption operation based on the file encryption information, and/or may selectively perform the disk encryption operation based on the disk encryption information. Thus, when writing the data to the storage device 300, the host controller 200 may perform no encryption operation, may perform one of the file encryption operation and the disk encryption information, or may perform both of the file encryption operation and the disk encryption information.

As illustrated in FIG. 2, in response to the command provided by the processor 130, the host controller 200 may write data 151, 152, 153 and 154 stored in the system memory 150 to the storage device 300, or may read data 301, 302, 303 and 304 from the storage device 300 to be stored in the system memory 150. When writing the data 151, 152, 153 and 154 to the storage device 300, the host controller 200 may selectively perform a file encryption operation, and/or a disk encryption operation.

For example, in a case where first data 151 stored in the system memory 150 are assumed to not be critical data, the host controller 200 may not perform an encryption operation on the first data 151 as the first data 151 is being written to the storage device 300. Thus, the first data 301 is not encrypted when stored in the storage device 300. As a result, when subsequently reading the first data 301 from the storage device 300, the host controller 200 need not perform a decryption operation on the first data 301 since it was never encrypted. Thus, the first data 151 may be referred to as non-encrypted or open data within the system memory 150.

In a case where the critical data or sensitive data is to be written to the storage device 300, the host controller 200 may perform a file encryption operation and/or a disk encryption operation. For example, the host controller 200 may perform the file encryption operation on second data 152 such that the "file-encrypted" second data 302 is written to the storage device 300. Thereafter, when the host controller 200 reads the file-encrypted second data 302 from the storage device 300, the host controller 200 must perform a file decryption operation (e.g., a file decryption operation corresponding to the file encryption operation) on the file-encrypted second data 302 in order to recover the original second data 152.

Alternately or additionally, the host controller 200 may perform a disk encryption operation on third data 153 such that the "disk-encrypted" third data 303 is written to the storage device 300. Thereafter, when the host controller 200 reads the disk-encrypted third data 303 from the storage device 300, the host controller 200 must perform a disk decryption operation (e.g., a disk decryption operation corresponding to the disk encryption operation) on the third data 303 such that original third data 153 may be recovered.

Finally, the host controller 200 may be used to sequentially perform the file encryption operation and disk encryption operation on fourth data 154 such that "file & disk-encrypted" fourth data 304 is written to the storage device 300. Thereafter, when the host controller 200 reads the file & disk encrypted fourth data 302 from the storage device 300, the host controller 200 must sequentially perform the disk decryption operation and the file decryption operation on the fourth data 304 in order to recover the original fourth data 154.

Here, the term "disk encryption operation" means an encryption operation that is performed using the same encryption key, or at least one disk encryption key for a designated disk partition, with respect to all sectors included in the partition. For example, as illustrated in FIG. 3, the storage device 300 may include a plurality of partitions 310, 320 and 330, and the disk encryption operation may encrypt respective sectors included in each partition 310 using the same encryption key for the partition 310. Thus, when data are written to respective sectors 1, 2, 3, 4, 5, 6, 7 and 8 included in a first partition 310, the data may be encrypted using a first encryption key for the first partition 310, and this encryption operation may be referred to as a first disk encryption operation. In the context of the example illustrated in FIG. 3, multiple (e.g., first, second and third) disk encryption operations may use different encryption keys respectively associated with one or more of the designated partition 310, 320 and 330.

The term "file encryption operation" means an encryption operation that is performed using different encryption keys with respect to different sectors of the storage device 300, and/or an encryption operation that is performed using different encryption keys with respect to different files being written to the storage device 300. For example, as illustrated in FIG. 4, the storage device 300 may again include a plurality of partitions 310, 320 and 330, where each partition 310, 320 and 330 includes a plurality of sectors 1 through 24. One file 350 may be stored in one sector, or may be stored in a plurality of sectors (e.g.,) sectors 2, 5 and 7 as illustrated in FIG. 4. When the file 350 is written to the sectors 2, 5 and 7, the file 350 will be file-encrypted using an encryption key (i.e., a file encryption key) that is different from other encryption key(s) used to file-encrypt other file(s) as they are written to the storage device 300.

As described above, the host controller 200 and SoC 100 including the host controller 200 according to certain embodiments of the inventive concept will support at least one file encryption operation and at least one disk encryption operation. Thus, when data are written to the storage device 300, the file encryption operation and/or the disk encryption operation may be performed. Accordingly, even if the storage device 300 is subsequently lost or stolen, valuable information contained in the data stored on the storage device 300 need not be lost or compromised. Further, since file encryption and disk encryption need not be strictly implemented in software run on the processor 130, but instead may be implemented in hardware using the host controller 200, the host controller 200 and SoC 100 including the host controller 200 may be operated to provide high data throughput. Still further, since file encryption and/or disk encryption may be performed by the host controller 200 running at a relatively low clock frequency, as compared with the processor 130, overall power consumption may be reduced.

Figure 5:
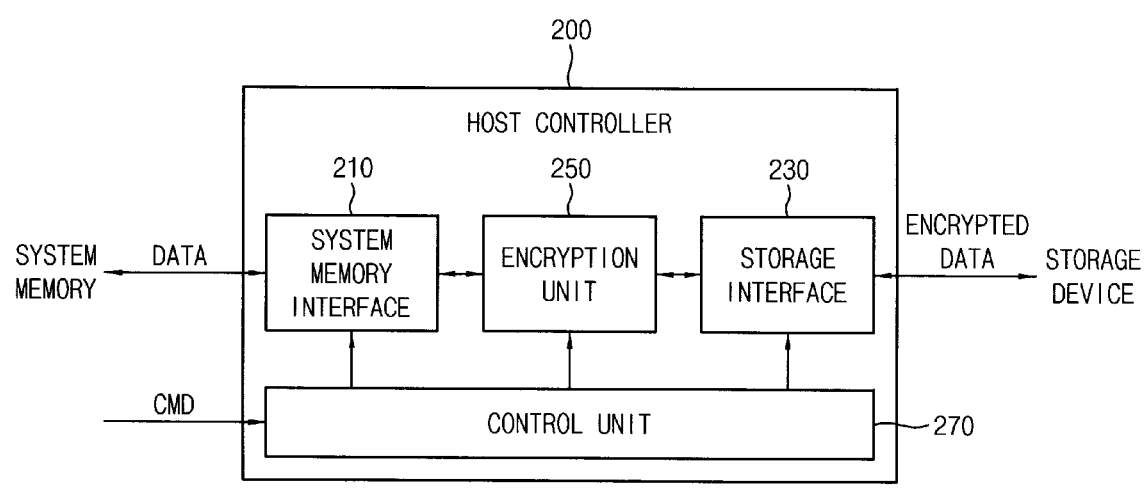
FIG. 5 is a block diagram illustrating a host controller according to example embodiments.

FIG. 5 is a block diagram illustrating in one example a host controller according to certain embodiments of the inventive concept.

Referring to FIG. 5, the host controller 200 configured to control the operation of a storage device comprises; a system memory interface 210, a storage interface 230, an encryption unit 250 and a control unit 270.

The system memory interface 210 may be used to communicate with a system memory. For example, the system memory interface 210 may be used to retrieve read data from the system memory during a read data operation, and/or store (or program) write data to the system memory. The storage interface 230 may be used to communicate with the storage device. For example, the storage interface 230 may be used to retrieve read data from the storage device, and/or write (or program) data to the storage device.

As conceptually illustrated in FIG. 5, the encryption unit 250 may be functionally coupled between the system memory interface 210 and the storage interface 230. In this configuration, the encryption unit 250 may be used to variously encrypt or decrypt data. For example, the encryption unit 250 may be used to encrypt data read from the system memory via the system memory interface 210. Then, the resulting encrypted data may be stored in the storage device via the storage interface 230. Further, the encryption unit 250 may be used to decrypt encrypted data read from the storage device via the storage interface 230 in order to provide the original data to be stored in the system memory via the system memory interface 210.

The control unit 270 may be used to control the overall operation of the host controller 200. For example, the control unit 270 may control the system memory interface 210 and the storage interface 230 in order to control the transfer of data between the system memory and storage device. Further, the control unit 270 may control the operation of the encryption unit 250 to encrypt data as it is written to the storage device, and/or decrypt encrypted data as it is read from the storage device.

The control unit 270 may be used to control the system memory interface 210, storage interface 230 and encryption unit 250 in order to write data from the system memory to the storage device in response to a command (CMD) provided by a processor. In certain embodiments, the processor may indirectly communicate the command via the system memory, where for example, the command may be stored in a format such as a universal flash storage (UFS) transfer protocol (UTP) command descriptor or a UTP transfer request descriptor. In other embodiments, the processor 130 may directly provide the control unit 270 with the command via an internal bus. In response to the command provided by the processor 130, the control unit 270 may control the encryption unit 250 to selectively perform a file encryption operation and/or a disk encryption operation.

In this regard, the command provided by the processor 130 may include file encryption information and/or disk encryption information. The control unit 270 may be used to extract the file encryption information and/or disk encryption information from the command by analyzing the command provided by the processor 130. Thereafter, the control unit 270 may be used to control the encryption unit 250 in response to the extracted file encryption information, and/or disk encryption information.

For example, when the file encryption information indicates that the file encryption operation should not be performed, and the disk encryption information indicates that the disk encryption operation is not to be performed, the control unit 270 may control the encryption unit 250 such that data are directly transferred from the system memory interface 210 to the storage interface 230, or such that the data bypass at least one encryption engine included in the encryption unit 250. When the file encryption information indicates that the file encryption operation should be performed, and the disk encryption information indicates that the disk encryption operation should not be performed, the control unit 270 may control the encryption unit 250 to perform only the file encryption operation. When the file encryption information indicates that the file encryption operation should not to be performed, and the disk encryption information indicates that the disk encryption operation should be performed, the control unit 270 may control the encryption unit 250 to perform only the disk encryption operation. Further, when the file encryption information indicates that the file encryption operation should be performed, and the disk encryption information indicates that the disk encryption operation should be performed, the control unit 270 may control the encryption unit 250 to sequentially perform the file encryption operation and the disk encryption operation. According to certain embodiments of the inventive concept, the disk encryption operation may be performed after the file encryption operation is performed, or the file encryption operation may be performed after the disk encryption operation is performed.

As described above, the host controller 200 of FIGS. 1, 2 and 5 supports the selective execution of a file encryption operation and/or a disk encryption function, or neither. Accordingly, overall data security associated with data stored on a attachable/detachable storage device may be strengthened. Further, since the host controller 200 may perform the file encryption operation and/or the disk encryption operation using the encryption unit 250 implemented in hardware, the host controller 200 may provide relatively high data throughput.

Figure 6:
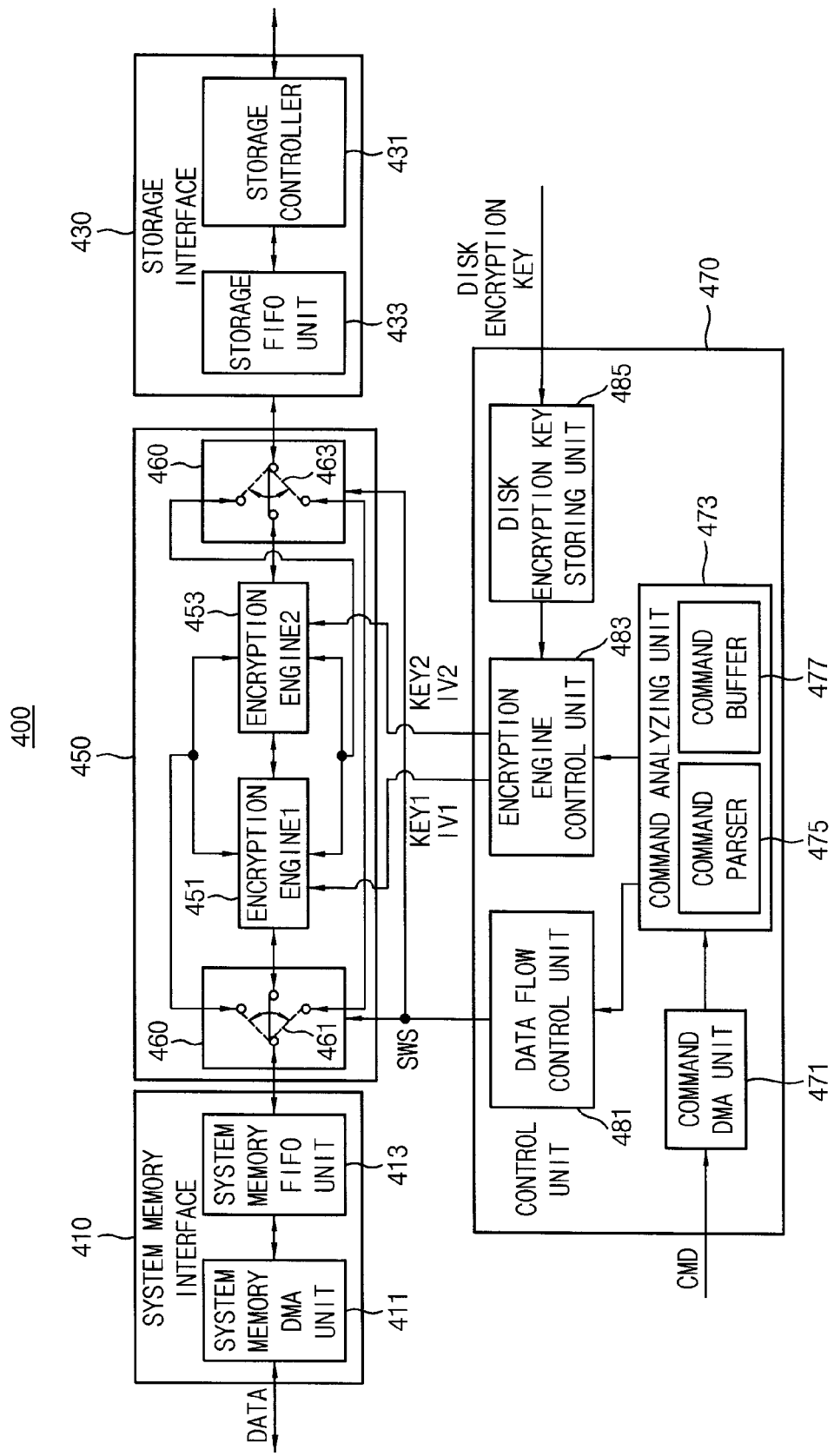
FIG. 6 is a block diagram illustrating a host controller according to example embodiments.

FIG. 6 is a somewhat more detailed block diagram further illustrating in one example a host controller 400 according to certain embodiments of the inventive concept.

Referring to FIG. 6, the host controller 400 configured to control the operation of a storage device comprises; a system memory interface 410, a storage interface 430, an encryption unit 450 and a control unit 470.

The system memory interface 410 communicates with a system memory. The system memory interface 410 includes a system memory direct memory access (DMA) unit 411 and a system memory first-in first-out (FIFO) unit 413. The system memory DMA unit 411 may be used to read data from the system memory, and may store the data in the system memory FIFO unit 413. The system memory DMA unit 411 may be used to directly access the system memory without the help of the processor, and thus data transfer between the system memory and the host controller 400 may be efficiently performed. The system memory FIFO unit 413 may be used to temporarily store the data read from the system memory, and the data stored in the system memory FIFO unit 413 may be written to the storage device via the encryption unit 450 and the storage interface 430. Further, the system memory FIFO unit 413 may temporarily store data read from the storage device via the storage interface 430 and the encryption unit 450, and the data stored in the system memory FIFO unit 413 may be written to the system memory via the system memory DMA unit 411.

The storage interface 430 communicates with the storage device. The storage interface 430 includes a storage controller 431 and a storage FIFO unit 433. The storage controller 431 may be used to control the storage device to read data from the storage device, and may store the read data in the storage FIFO unit 433. The storage FIFO unit 433 may temporarily store the read data, and the data stored in the storage FIFO unit 433 may be written to the system memory via the encryption unit 450 and the system memory interface 410. Further, the storage FIFO unit 433 may temporarily store data read from the system memory via the system memory interface 410 and the encryption unit 450, and the data stored in the storage FIFO unit 433 may be written to the storage device via the storage controller 431.

The encryption unit 450 may be functionally coupled between the system memory interface 410 and storage interface 430, and may be used to encrypt and/or decrypt data. The encryption unit 450 of FIG. 6 includes a first encryption engine 451, a second encryption engine 453 and a data path forming unit 460. Each of the first and second encryption engines 451 and 453 may be used to perform a file encryption operation or a disk encryption operation when data are written to the storage device, and may perform a file decryption operation (or a decryption operation corresponding to the file encryption operation) or a disk decryption operation (or a decryption operation corresponding to the disk encryption operation) when data are read from the storage device. The data forming unit 460 may be controlled by the control unit 470 to form a data path between the system memory interface 410 and the storage interface 430. In some embodiments, the data forming unit 460 may include a first switch 461 coupled to the system memory interface 410 and a second switch 463 coupled to the storage interface 430.

The control unit 470 may again be used to control the overall operation of the host controller 400 in response to the command (CMD) provided by a processor. For example, the control unit 470 may include a command DMA unit 471, a command analyzing unit 473, a data flow control unit 481, an encryption engine control unit 483 and a disk encryption key storing unit 485.

The processor may write a command to the system memory. In some embodiments, the processor may write a UTP transfer request descriptor as the command to the system memory. The command DMA unit 471 may read the UTP transfer request descriptor as the command from the system memory. Although FIG. 6 illustrates an example where the control unit 470 includes the command DMA unit 471 for reading the command from the system memory, in some embodiments, the control unit 470 may read the command from the system memory using the system memory DMA unit 411 included in the system memory interface 410.

The command analyzing unit 473 may be used to analyze the command received from the command DMA unit 471. For example, the command analyzing unit 473 may include a command parser 475 that parses the command, and a command buffer 477 that stores information extracted from the command by the command parser 475.

In certain embodiments, the command may be provided in a form of the UTP transfer request descriptor to the control unit 470. The UTP transfer request descriptor may include a data direction (DD) field representing a direction of data transfer, and a UTP command descriptor base address (UCDBA) field representing an address of a UTP command descriptor. The command DMA unit 471 may read the UTP command descriptor at the address indicated by the UCDBA field from the system memory. The UTP command descriptor may include a physical region description table (PRDT) representing information about data stored in the system memory. The PRDT may include file encryption information for a file encryption operation and disk encryption information for a disk encryption operation. The command analyzing unit 473 may extract the file encryption information and the disk encryption information from the PRDT. For example, the file encryption information may include information about whether the file encryption operation is to be performed or not to be performed, information about an algorithm used in the file encryption operation, information about a length of a file encryption key used in the file encryption operation, the file encryption key used in the file encryption operation, a file tweak key in the file encryption operation, and a file initialization vector (File IV) used in the file encryption operation. Further, the disk encryption information may include information about whether the disk encryption operation is to be performed or not to be performed, information about an algorithm used in the disk encryption operation, and disk initialization vector (Disk IV) used in the disk encryption operation.

The file encryption operation may use different file encryption keys with respect to different sectors, and the file encryption key may be transferred by the command (or the PRDT included in the command). The disk encryption operation may use the same disk encryption key with respect to a plurality of sectors included in one partition, and the disk encryption key may be previously stored in the disk encryption key storing unit 485. In some embodiments, when the host controller 400 is initialized, or while the host controller 400 normally operates, the processor may store the disk encryption key, and in some embodiments along with a disk tweak key, in the disk encryption key storing unit 485. In some embodiments, the disk encryption key storing unit 485 may be implemented by a special function register (SFR) of the host controller 400. In some embodiments where the storage device includes a plurality of partitions, and the disk encryption key storing unit 485 may store different disk encryption keys with respect to different partitions.

The data flow control unit 481 may be used to control the data path forming unit 460 of the encryption unit 450 based on the file encryption information and the disk encryption information extracted by the command analyzing unit 473. The encryption engine control unit 483 may control the first encryption engine 451 and the second encryption engine 453 based on the file encryption information and the disk encryption information extracted by the command analyzing unit 473.

For example, when the DD field indicates that data are to be written to the storage device, the file encryption information indicates that the file encryption operation is to be performed, and the disk encryption information indicates that the disk encryption operation is to be performed, the encryption engine control unit 483 may control the first encryption engine 451 to perform the file encryption operation, and may control the second encryption engine 453 to perform the disk encryption operation. In some embodiments, to perform the file encryption operation, the encryption engine control unit 483 may provide the first encryption engine 451 with a file encryption key KEY1 included in the file encryption information and a file initialization vector IV1 included in the file encryption information. Further, to perform the disk encryption operation, the encryption engine control unit 483 may provide the second encryption engine 453 with a disk encryption key KEY2 stored in disk encryption key storing unit 485 and a disk initialization vector IV2 included in the disk encryption information. The data flow control unit 481 may control the data path forming unit 460 such that the first encryption engine 451 and the second encryption engine 453 are connected in series between the system memory interface 410 and the storage interface 430. For example, the data flow control unit 481 may apply a switching signal SWS to the first and second switches 461 and 463 to series connect the first and second encryption engines 451 and 453. Accordingly, data read from the system memory via the system memory interface 410 may be encrypted by the file encryption operation performed by the first encryption engine 451, and may be further encrypted by the disk encryption operation performed by the second encryption engine 453. Thus, the data on which the file encryption operation and the disk encryption operation are performed may be stored in the storage device via the storage interface 430.

When the data on which the file encryption operation and the disk encryption operation are sequentially performed are read from the storage device, the data flow control unit 481 may control the data path forming unit 460 such that the first encryption engine 451 and the second encryption engine 453 are connected in series, and the encryption engine control unit 483 may control the first encryption engine 451 and the second encryption engine 453 to perform the file decryption operation and the disk decryption operation, respectively. Thus, the disk decryption operation may be performed on the data by the second encryption engine 453, and then the file decryption operation may be further performed on the data by the first encryption engine 451. Accordingly, the original data may be recovered.

In another example, when the file encryption information indicates that the file encryption operation should be performed, and the disk encryption information indicates that the disk encryption operation should not be performed, the encryption engine control unit 483 may control the first and second encryption engines 451 and 453 to perform the file encryption operation, and the data flow control unit 481 may control the data path forming unit 460 such that the first encryption engine 451 and the second encryption engine 453 are functionally connected in parallel with each other between the system memory interface 410 and the storage interface 430. Thus, the file encryption operation by the first encryption engine 451 and the file encryption operation by the second encryption engine 453 may be simultaneously performed in parallel. Accordingly, the overall processing time required for the file encryption operation may be reduced.

In still another example, when the file encryption information indicates that the file encryption operation should not to be performed, and the disk encryption information indicates that the disk encryption operation should be performed, the encryption engine control unit 483 may control the first and second encryption engines 451 and 453 to perform the disk encryption operation, and the data flow control unit 481 may control the data path forming unit 460 such that the first encryption engine 451 and the second encryption engine 453 are functionally connected in parallel between the system memory interface 410 and the storage interface 430. Thus, the disk encryption operation by the first encryption engine 451 and the disk encryption operation by the second encryption engine 453 may be simultaneously performed in parallel at least in part. Accordingly, the overall processing time required for the disk encryption operation may be reduced.

In still another example, when the file encryption information indicates that the file encryption operation should not be performed, and the disk encryption information indicates that the disk encryption operation should also not be performed, the data flow control unit 481 may control the data path forming unit 460 to connect the system memory interface 410 and the storage interface 430, such that data bypass the first and second encryption engines 451 and 453. Thus, no encryption operation will be performed by the first and second encryption engines 451 and 453.

As described above in relation to the embodiment illustrated in FIG. 6, the host controller 400 supports one, both or none of a file encryption and disk encryption functionality. Accordingly, the data security provided by a storage device compatible with a computational system according to an embodiment of the inventive concept may be strengthened. Further, since the host controller 400 performs the file encryption operation and/or the disk encryption operation using the encryption unit 450 that is implemented in hardware, the host controller 400 may achieve a relatively high data throughput. Further, since in certain embodiment the host controller 400 may selectively connect the two encryption engines 451 and 453 in series to sequentially perform the file encryption operation and the disk encryption operation, or in parallel when only one of the file encryption operation and disk encryption operation is called for, the overall time required for encryption processing may be reduced.

Figure 7A:
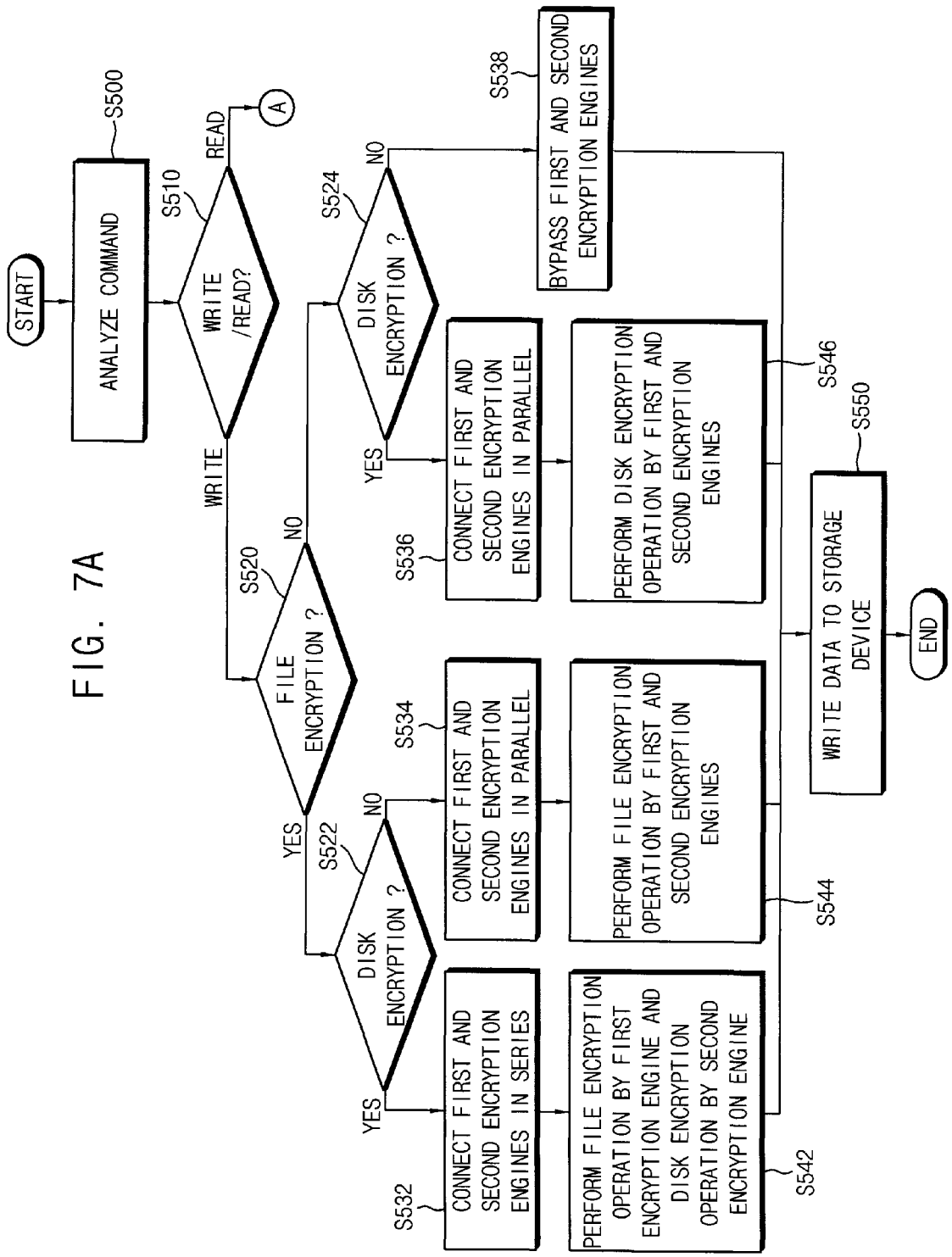
FIGS. 7A and 7B are a flow chart illustrating a method of operating a host controller according to example embodiments.
Figure 7B:
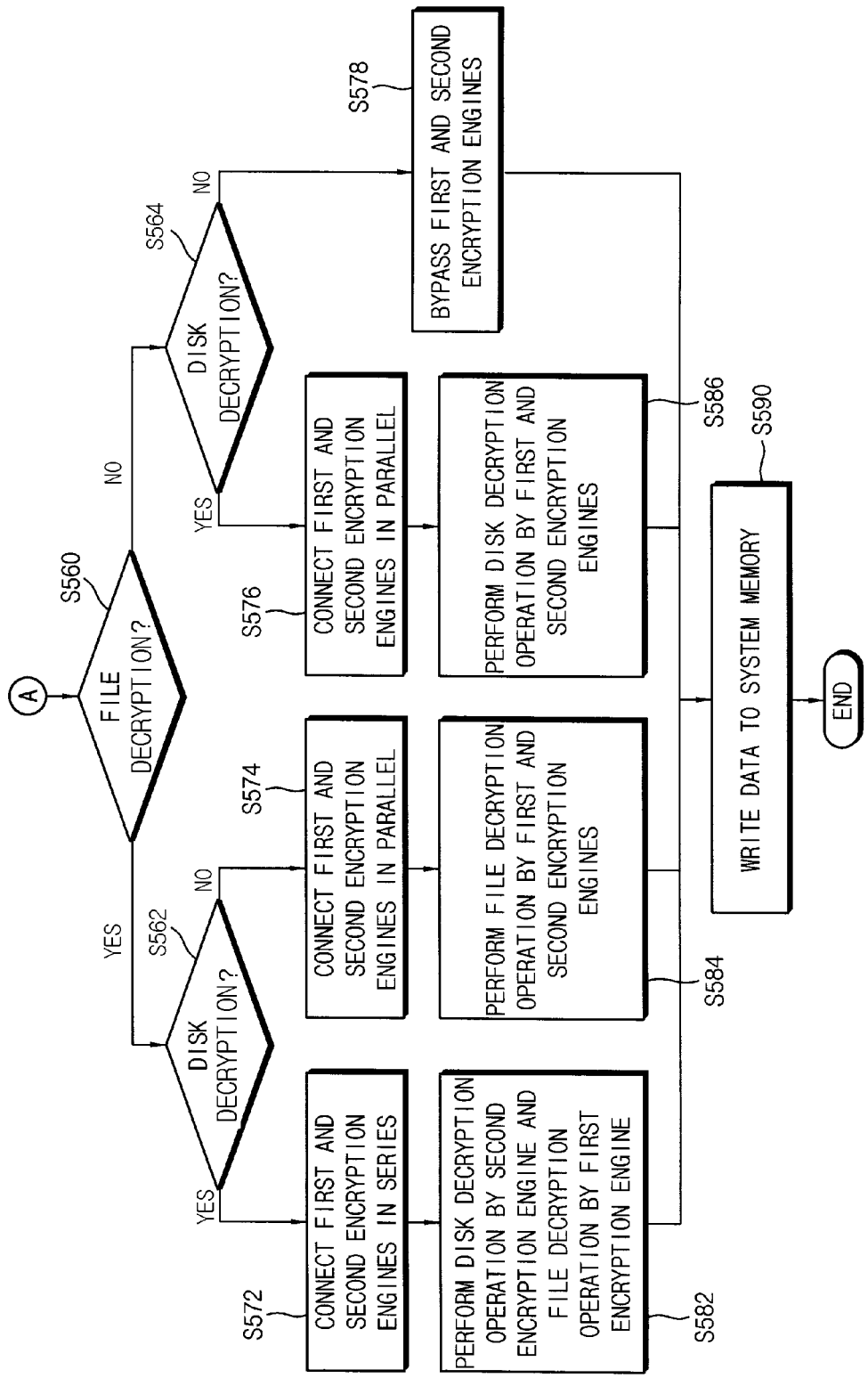

FIG. 7, inclusive of FIGS. 7A and 7B, is a flowchart summarizing in one example a method of operating a host controller according to certain embodiments of the inventive concept. FIG. 8 is a conceptual diagram illustrating in one possible example a physical region description table (PRDT) including file encryption information and disk encryption information. FIGS. 9A, 9B, 9C and 9D are respective block diagrams variously illustrating operative alternatives for the host controller of FIG. 6.

Referring to FIGS. 6 and 7, the control unit 470 is used to analyze a command (CMD) provided by a processor (S550). As before the command may be provided in the form of a UTP transfer request descriptor including a data direction (DD) field indicating a direction of data transfer. The control unit 470 may determine which one of a write operation or a read operation is performed based on the DD field (S510).

When the command indicates a write operation (S510: WRITE), the host controller 400 will write data stored in a system memory to a storage device. The control unit 470 may determine whether a file encryption operation should be performed based on file encryption information included in the command (S520), and/or whether a disk encryption operation should be performed based on disk encryption information included in the command CMD (S522 and S524). In certain embodiments, the UTP transfer request descriptor may include a UCDBA field representing an address of a UTP command descriptor, and the control unit 470 may read the UTP command descriptor at the address indicated by the UCDBA field from the system memory. The UTP command descriptor may include a physical region description table (PRDT) including information about data to be written or read, the file encryption information and the disk encryption information.

For example, as illustrated in FIG. 8, the PRDT 600 includes various information characterizing certain data and may include a data base address field representing an address of the data in the system memory, a data byte count field representing the number of bytes of the data, a disk algorithm selector (DAS) field representing whether the disk encryption operation is to be performed as the disk encryption information, and a file algorithm selector (FAS) field representing whether the file encryption operation is to be performed as the file encryption information. In this illustrated context, the control unit 470 may control operation of the encryption unit 450 to selectively perform the file encryption operation according to the FAS field, and may further control the encryption unit 450 to selectively perform the disk encryption operation according to the DAS field.

In certain embodiments, the DAS field may indicate a type of encryption algorithm used during the disk encryption operation, and the FAS field may indicate a type of encryption algorithm used during the file encryption operation. For example, a DAS field value of '00' may indicate that the disk encryption operation will not to be performed, a DAS field value of '01' may indicate that the disk encryption operation based on an advanced encryption standard (AES) of a cipher block chaining (CBC) mode (AES-CBC) will be performed, and a DAS field value of '10' may indicate that the disk encryption operation based on an AES of a Xor-encrypt-Xor (XEX) based tweaked-codebook mode with ciphertext stealing (XTS) (AES-XTS) will be performed.

A FAS field value of '00' may indicate that the file encryption operation will not be performed, a FAS field value of '01' may indicate that the file encryption operation based on AES-CBC will be performed, and a FAS field value of '10' may indicate that the file encryption operation based on AES-XTS will be performed. Although FIG. 8 illustrates an example where an AES-CBC encryption algorithm or an AES-XTS encryption algorithm is used during file encryption operation and/or the disk encryption operation, the host controller 500 may user various encryption algorithms to perform the file encryption operation and/or disk encryption operation. For example, the host controller 400 may use various encryption algorithms, such as data encryption standard (DES), Tripple-data encryption standard (T-DES), encrypted salt-sector initialization vector (AES-ESSIV), AES-Liskov, Rivest, and Wagner (AES-LRW), AES-XEX, etc.

In certain embodiments, the PRDT 600 may further include, as the disk encryption information, a disk key length (DKL) field representing a length of an encryption key used in the disk encryption operation, and a disk initialization vector (Disk IV) field representing an initialization vector used in the disk encryption operation.

In certain other embodiments, the PRDT 600 may further include, as the file encryption information, a file key length (FKL) field representing a length of an encryption key used in the file encryption operation, a file initialization vector (File IV) field representing an initialization vector used in the file encryption operation, a file encryption key field representing an encryption key used in the file encryption operation, and a file tweak key field representing a tweak key used in the file encryption operation.

When the FAS field indicates that the file encryption operation will be performed (S520: YES), and the DAS field indicates that the disk encryption operation will be performed (S522: YES), the controller 470 may, as illustrated in FIG. 9A, provide a switching signal SWS to a data path forming unit 460a to connect first and second encryption engines 451a and 453a in series (S532). Thus, a data path may be formed from a system memory interface 410 through the first encryption engine 451a and the second encryption engine 453a to a storage interface 420. In this case, the control unit 470 may provide a file encryption key FEK and a file initialization vector FIV (in some example embodiments, along with a file tweak key) to the first encryption engine 451a to perform the file encryption operation. Further, the control unit 470 may provide a disk encryption key DEK and a disk initialization vector DIV (in some example embodiments, along with a disk tweak key) to the second encryption engine 453a to perform the disk encryption operation. Thus, the data read from the system memory will be encrypted by the file encryption operation performed by the first encryption engine 451a, and may then be further encrypted by the disk encryption operation performed by the second encryption engine 453a (S542). Then, the resulting file & disk encrypted data may be written to the storage device (S550).

Figure 9B:
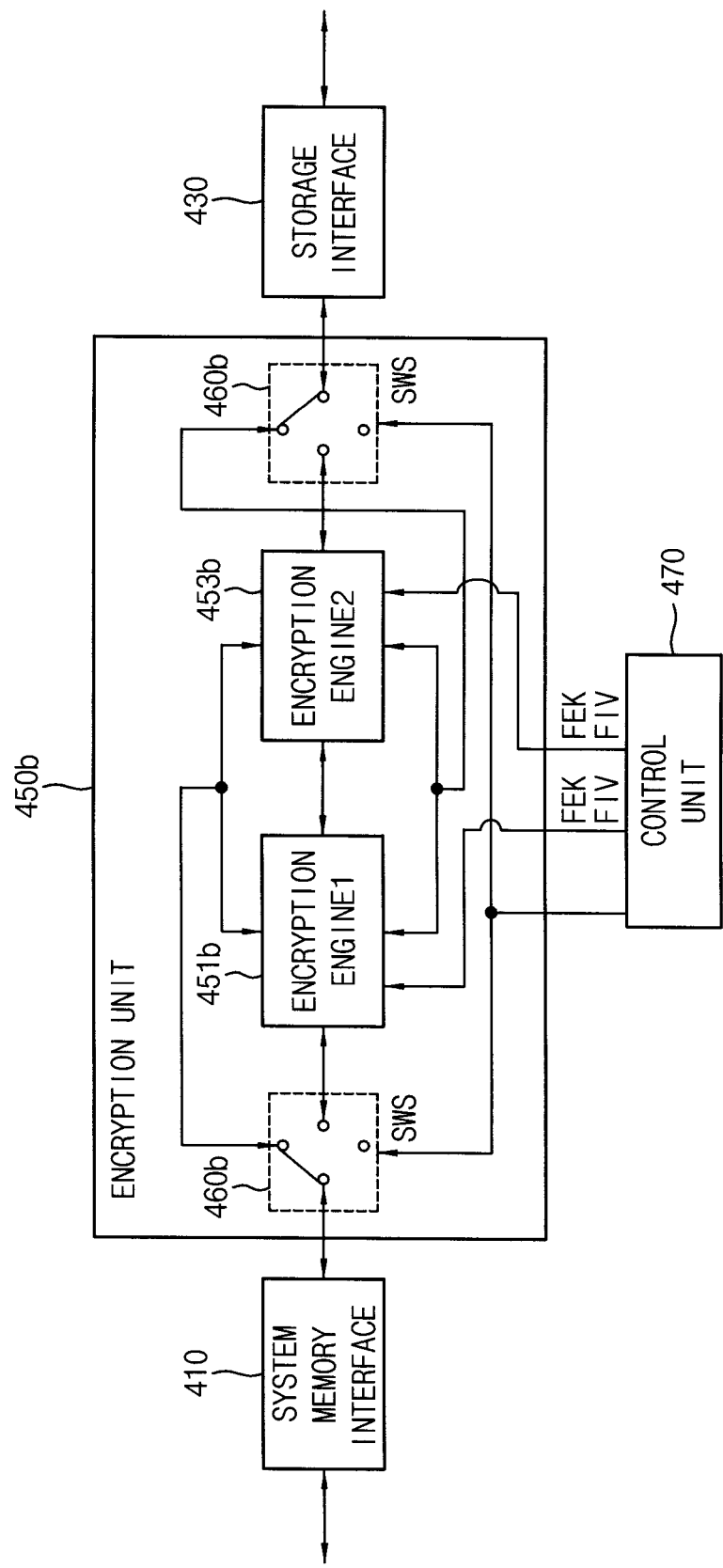

When the FAS field indicates that the file encryption operation will be performed (S520: YES), and the DAS field indicates that the disk encryption operation will not be performed (S522: NO), the controller 470 may, as illustrated in FIG. 9B, provide a switching signal SWS to a data path forming unit 460b to connect first and second encryption engines 451b and 453b in parallel (S534). The control unit 470 may provide the file encryption key FEK and the file initialization vector FIV (in some example embodiments, along with the file tweak key) to the first and second encryption engines 451b and 453b to perform the file encryption operation. Thus, the data read from the system memory may be encrypted by the file encryption operation efficiently performed by the first and second encryption engines 451b and 453b connected in parallel (S544). Then, the resulting file-encrypted data may be written to the storage device (S550).

Figure 9C:
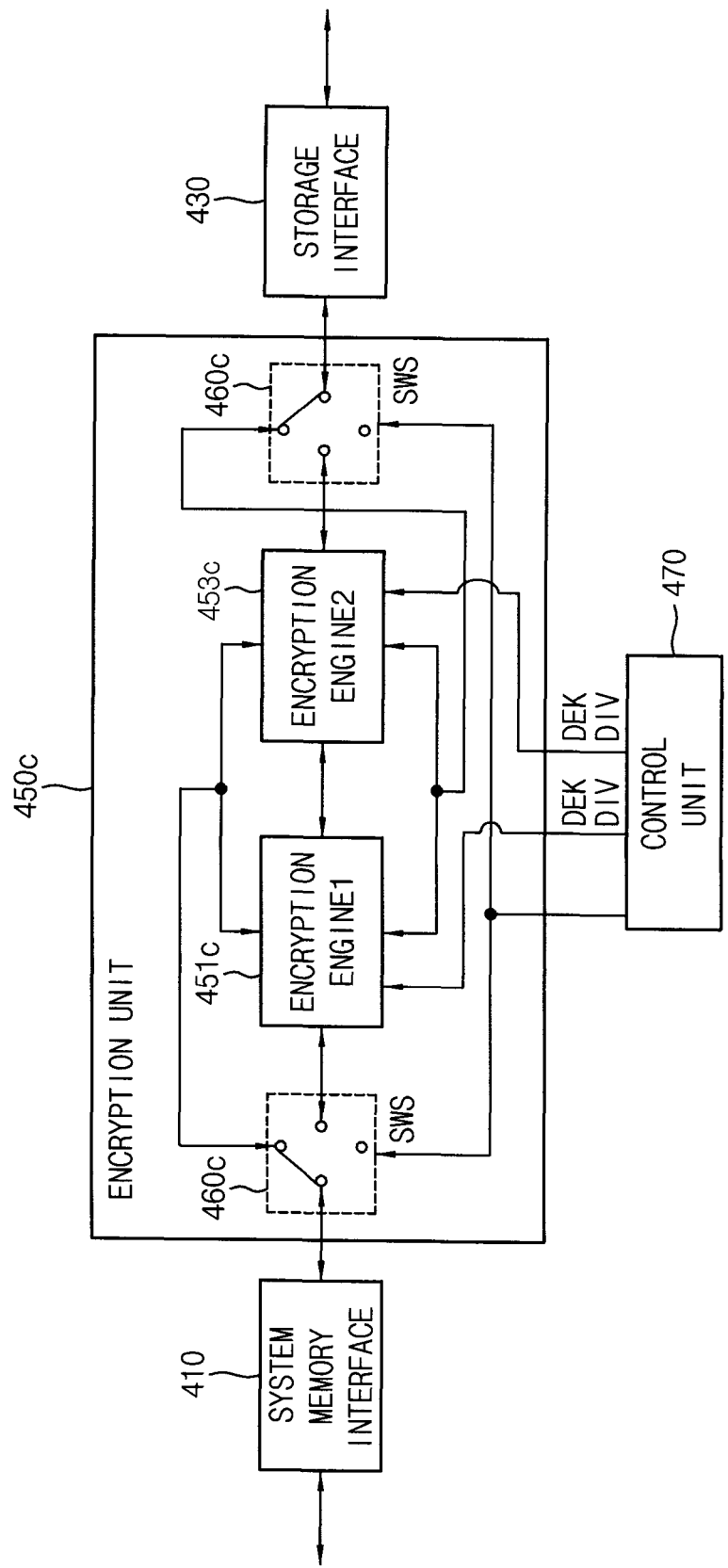

When the FAS field indicates that the file encryption operation will not be performed (S520: NO), and the DAS field indicates that the disk encryption operation will be performed (S524: YES), the controller 470 may, as illustrated in FIG. 9C, provide a switching signal SWS to a data path forming unit 460c to connect first and second encryption engines 451c and 453c in parallel (S536). The control unit 470 may provide the disk encryption key DEK and the disk initialization vector DIV (in some example embodiments, along with the disk tweak key) to the first and second encryption engines 451c and 453c to perform the disk encryption operation. Thus, the data read from the system memory may be efficiently encrypted by the disk encryption operation performed by the first and second encryption engines 451c and 453c connected in parallel (S546). Then, the resulting disk-encrypted data may be written to the storage device (S550).

Figure 9D:
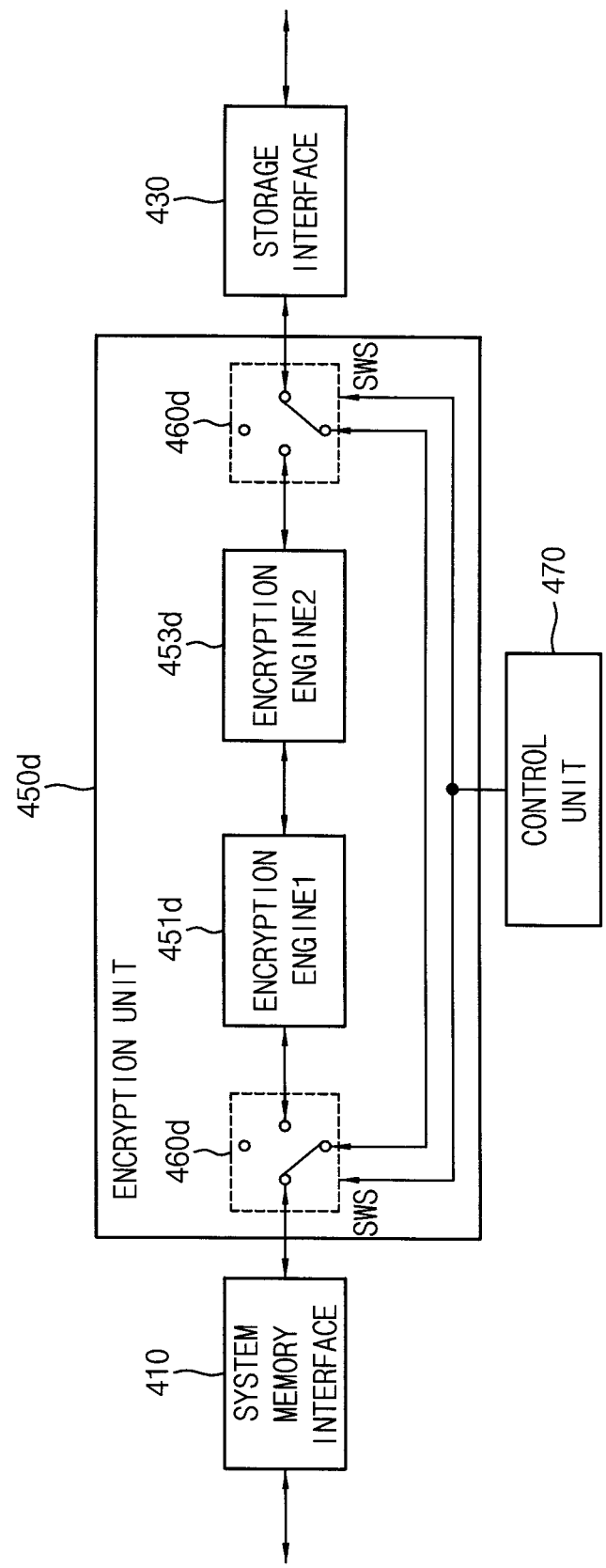

Further, when the FAS field indicates that the file encryption operation will not be performed (S520: NO), and the DAS field indicates that the disk encryption operation will not be performed (S524: NO), the controller 470 may, as illustrated in FIG. 9D, provide a switching signal SWS to a data path forming unit 460d to connect the system memory interface 410 and the storage interface 430 such that the data functionally bypasses the first and second encryption engines 451d and 453d (S538). Thus, the data read from the system memory need not be encrypted, and may be written to the storage device (S550) as open data.

When the command indicates the read operation (S510: READ), the host controller 400 may read data from the storage device to store the read data in the system memory. The control unit 470 may determine whether a file decryption operation will be performed based on the FAS field (S560), and/or whether a disk decryption operation will be performed based on the DAS field (S562 and S564).

When the FAS field indicates that the file decryption operation will be performed (S560: YES), and the DAS field indicates that the disk decryption operation will be performed (S562: YES), the controller 470 may, as illustrated in FIG. 9A, control the data path forming unit 460a to connect the first and second encryption engines 451a and 453a in series (S572). The control unit 470 may control the first and second encryption engines 451a and 453a to perform the file decryption operation and the disk decryption operation, respectively. Thus, the data (on which the file encryption operation and the disk encryption operation are performed) read from the storage device may be decrypted by the disk decryption operation performed by the second encryption engine 453a, and then may be further decrypted by the file decryption operation performed by the first encryption engine 451a (S582). Accordingly, the original data may be recovered and stored in the system memory (S590).

When the FAS field indicates that the file decryption operation is to be performed (S560: YES), and the DAS field indicates that the disk decryption operation will not be performed (S562: NO), the controller 470 may, as illustrated in FIG. 9B, control the data path forming unit 460b to connect the first and second encryption engines 451b and 453b in parallel (S574). The control unit 470 may control the first and second encryption engines 451b and 453b to perform the file decryption operation. Thus, the data (on which the file encryption operation is performed) read from the storage device may be efficiently decrypted by the file decryption operation performed by the first and second encryption engines 451b and 453b connected in parallel (S584). Accordingly, the original data may be rapidly recovered and stored in the system memory (S590).

When the FAS field indicates that the file decryption operation will not be performed (S560: NO), and the DAS field indicates that the disk decryption operation will be performed (S564: YES), the controller 470 may, as illustrated in FIG. 9C, provide control the data path forming unit 460c to connect the first and second encryption engines 451c and 453c in parallel (S576). The control unit 470 may control the first and second encryption engines 451c and 453c to perform the disk decryption operation. Thus, the data (on which the disk encryption is performed) read from the storage device may be decrypted by the disk decryption operation performed in parallel by the first and second encryption engines 451c and 453c, and thus the disk decryption operation may be rapidly performed (S586). Accordingly, the original data may be rapidly recovered and stored in the system memory (S590).

Further, when the FAS field indicates that the file decryption operation will not be performed (S560: NO), and the DAS field indicates that the disk decryption operation will not be performed (S564: NO), the controller 470 may, as illustrated in FIG. 9D, control the data path forming unit 460d to connect the system memory interface 410 and the storage interface 430 such that the data functionally bypasses the first and second encryption engines 451d and 453d (S578). Thus, the data (on which no encryption operation is performed) read from the storage device may be efficiently stored in the system memory (S590).

Figure 10:
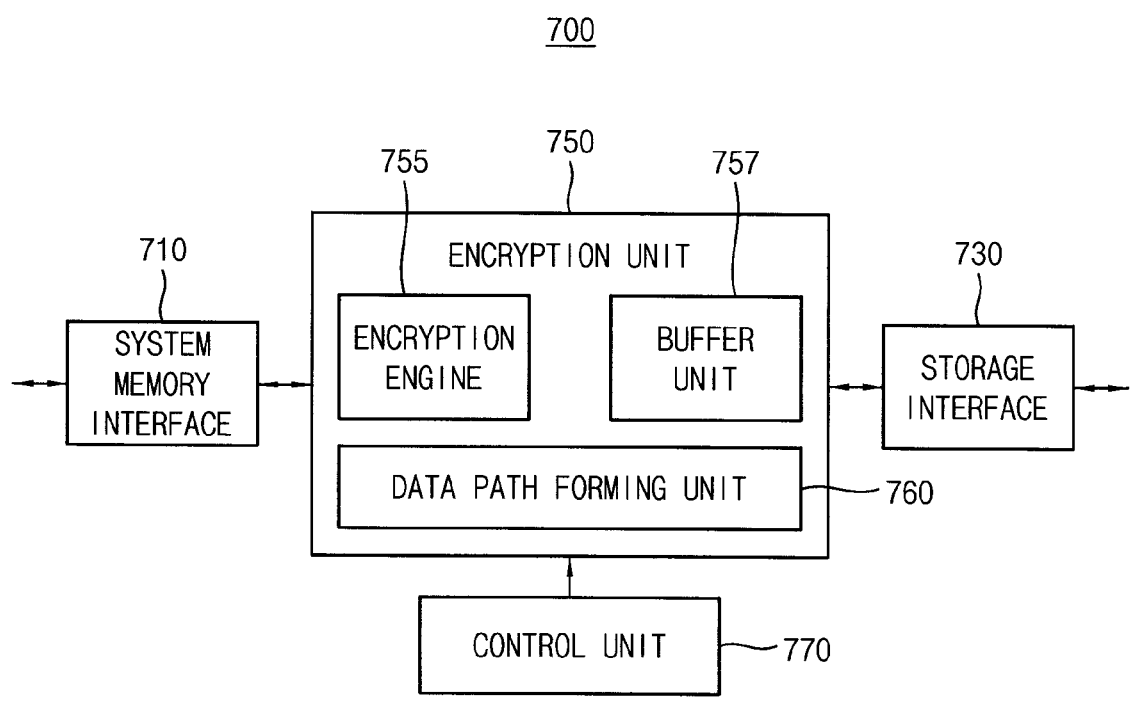
FIG. 10 is a block diagram illustrating a host controller according to example embodiments.

FIG. 10 is a block diagram illustrating a host controller 700 according to certain embodiments of the inventive concept.

Referring to FIG. 10, the host controller 700 configured to control a storage device comprises a system memory interface 710, a storage interface 730, an encryption unit 750 and a control unit 770. The host controller 700 of FIG. 10 may have a similar configuration as the host controller 400 of FIG. 6, except for a configuration of the encryption unit 750.

The system memory interface 710 communicates with a system memory, and the storage interface 730 communicates with the storage device. The encryption unit 750 is functionally coupled between the system memory interface 710 and storage interface 730. The encryption unit 750 illustrated in FIG. 10 includes an encryption engine 755 that performs a file encryption operation and/or a disk encryption operation and includes a buffer unit 757 that temporarily stores data encrypted by the encryption engine 755, and a data path forming unit 760 configured to form a data path between the system memory interface 710 and the storage interface 730.

The control unit 770 may be used to control operation of the host controller 700 in response to the command provided by a processor. When file encryption information and disk encryption information included in the command indicate no encryption operation, the control unit 770 may control the data path forming unit 760 to form the data path bypassing the encryption engine 755. When the file encryption information and the disk encryption information indicate one encryption operation of the file encryption operation and the disk encryption operation, the control unit 770 may control the encryption engine 755 to perform the one encryption operation, and may control the data path forming unit 760 to form the data path through the encryption engine 755. Further, when the file encryption information and the disk encryption information indicate both of the file encryption operation and the disk encryption operation, the control unit 770 may control the encryption engine 755 to perform the file encryption operation during a first time period, and may control the data path forming unit 760 to form the data path from the system memory interface 710 through the encryption engine 755 to the buffer unit 757 during the first time period such that the data provided from the system memory pass the encryption engine 755 and are stored in the buffer unit 757. Further, during a second time period after the first time period, the control unit 770 may control the encryption engine 755 to perform the disk encryption operation, and may control the data path forming unit 760 to form the data path from the buffer unit 757 through the encryption engine 755 to the storage interface 730 such that the data stored in the buffer unit 757 again pass the encryption engine 755 and are provided to the storage device.

As described above, the host controller 700 of FIG. 10 supports both, one or none of the file encryption function and disk encryption function. Accordingly, the data security provided by the storage device may be strengthened. Further, since the host controller 700 performs the file encryption operation and/or the disk encryption operation using the encryption unit 750 that is implemented in hardware, the host controller 700 may operate with high data throughput.

Figure 11:
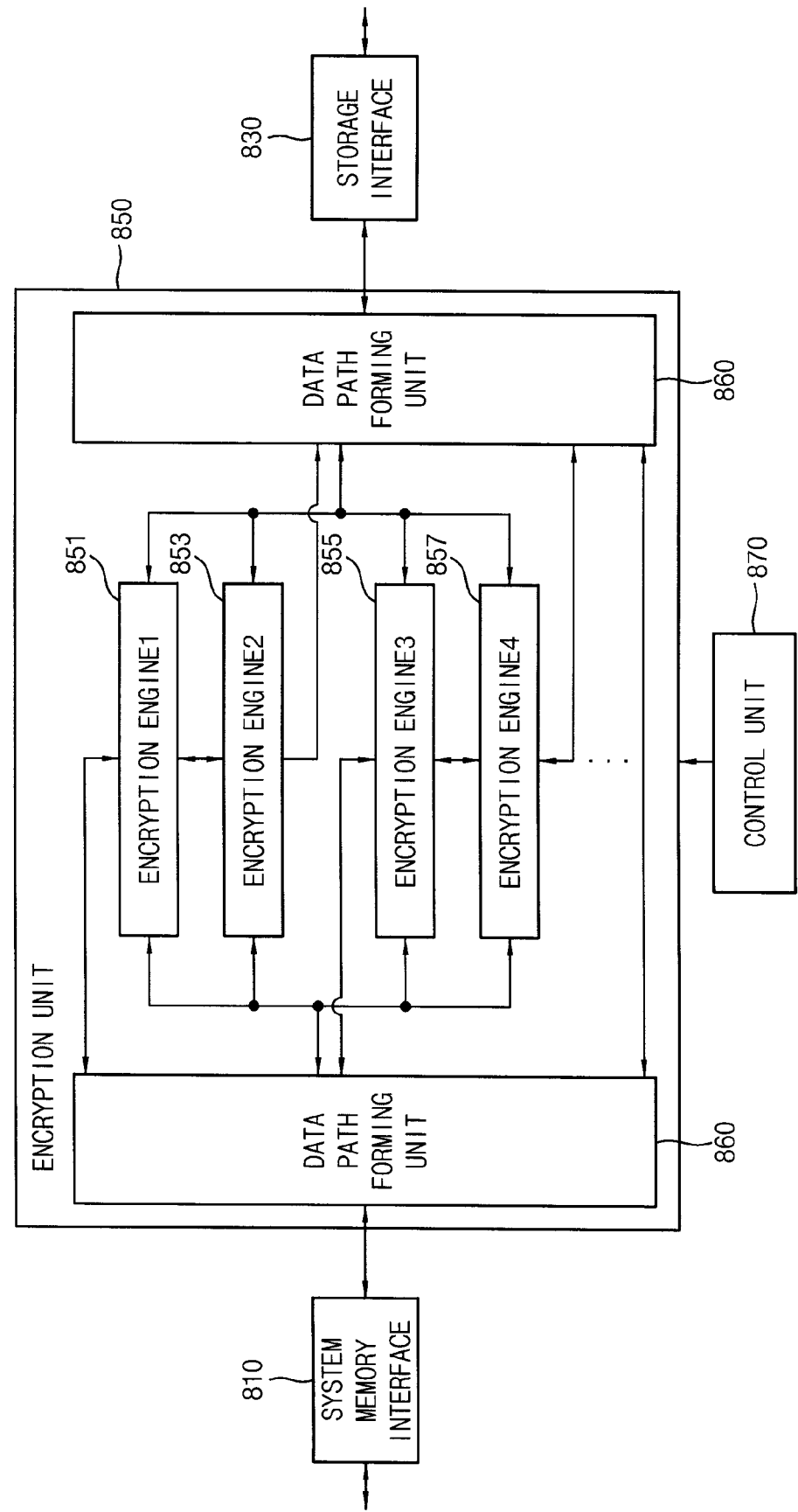
FIG. 11 is a block diagram illustrating a host controller according to example embodiments.

FIG. 11 is a block diagram illustrating a host controller 800 according to certain embodiments of the inventive concept.

Referring to FIG. 11, the host controller 800 configured to control a storage device comprises a system memory interface 810, a storage interface 830, an encryption unit 850 and a control unit 870. The host controller 800 of FIG. 11 may have a similar configuration as the host controller 400 of FIG. 6, except for a configuration of the encryption unit 850.

The system memory interface 810 communicates with a system memory, and the storage interface 830 communicates with the storage device. The encryption unit 850 may be functionally coupled between the system memory interface 810 and storage interface 830. The encryption unit 850 may include a plurality of (e.g., four) encryption engines 851, 853, 855 and 857 each performing a file encryption operation or a disk encryption operation, and a data path forming unit 860 configured to form a data path between the system memory interface 810 and the storage interface 830.

The control unit 870 is configured to control the overall operation of the host controller 800 in response to a command provided by a processor. When file encryption information and disk encryption information included in the command indicate no encryption operation, the control unit 870 may control the data path forming unit 860 to form the data path bypassing the encryption engines 851, 853, 855 and 857. When the file encryption information and the disk encryption information indicate one encryption operation of the file encryption operation and the disk encryption operation, the control unit 870 may control the encryption engines 851, 853, 855 and 857 to perform the one encryption operation, and may control the data path forming unit 860 such that the encryption engines 851, 853, 855 and 857 are connected in parallel. Accordingly, the overall processing time required by the encryption operation may be reduced. Further, when the file encryption information and disk encryption information indicate both of the file encryption operation and the disk encryption operation, the control unit 870 may control the first and third encryption engines 851 and 855 to perform the file encryption operation, may control the second and fourth encryption engines 853 and 857 to perform the disk encryption operation, and may control the data path forming unit to form a first data path where the first and second encryption engines 851 and 853 are connected in series between the system memory interface 810 and the storage interface 830, and to form a second data path where the third and fourth encryption engines 855 and 857 are connected in series between the system memory interface 810 and the storage interface 830. Accordingly, the file and disk encryption operations may be performed simultaneously at the plurality of data paths, which results in the reduction of the process time of the file and disk encryption operations.

As described above, the host controller 800 of FIG. 11 supports one, both or none of the file encryption function and the disk encryption function. Accordingly, the security for the storage device may be strengthened. Further, since the host controller 800 performs the file encryption operation and/or the disk encryption operation using the encryption unit 850 that is implemented in hardware, the host controller 800 may provide high data throughput. Further, the host controller 800 may more rapidly perform the file encryption operation and/or the disk encryption operation using the plurality of encryption engines 851, 853, 855 and 857.

Figure 12:
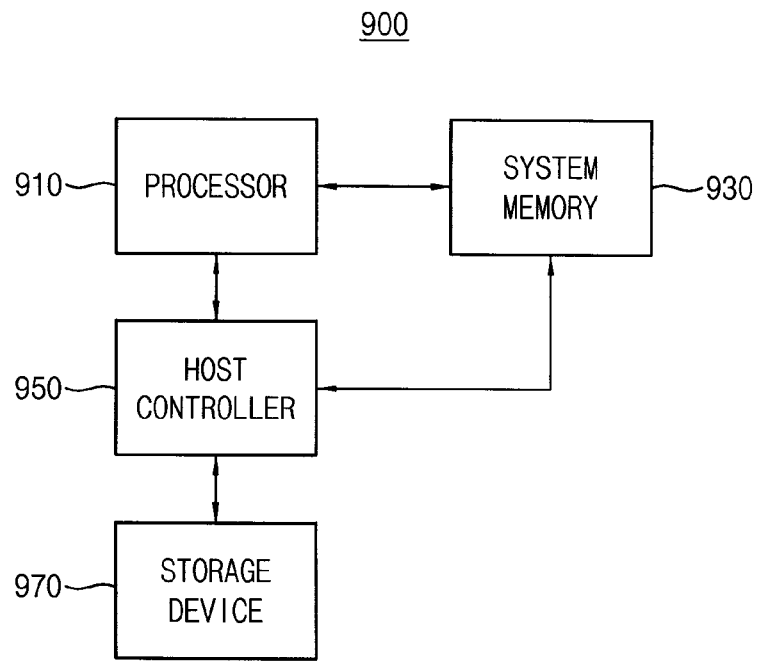
FIG. 12 is a block diagram illustrating a computational system according to example embodiments.

FIG. 12 is a block diagram illustrating a computational system according to certain embodiments of the inventive concept.

Referring to FIG. 12, a computational system 900 comprises; a processor 910, a system memory 930, a host controller 950 and a storage device 970. The computational system 900 may have a similar configuration as the computational system 100 of FIG. 1, except that the host controller 950 and the processor 910 are formed at different chips.

The host controller 950 may be implemented on one chip different from a second chip on which the processor 910 has been implemented. In some embodiments, the first chip on which the host controller 950 is formed may be disposed on a motherboard or a main board. When data are written to the storage device 970, the host controller 950 may perform a file encryption operation, may perform a disk encryption operation, or may perform both of the file encryption operation and the disk encryption operation. Thus, the host controller 950 supports one, both or none of a file encryption function and a disk encryption function.

Figure 13A:
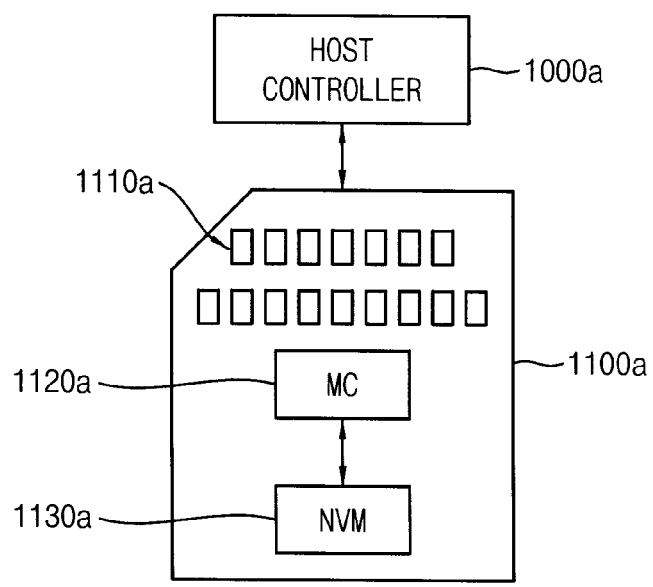
FIGS. 13A through 13C are diagrams illustrating examples of a storage device controlled by a host controller according to example embodiments.
Figure 13B:
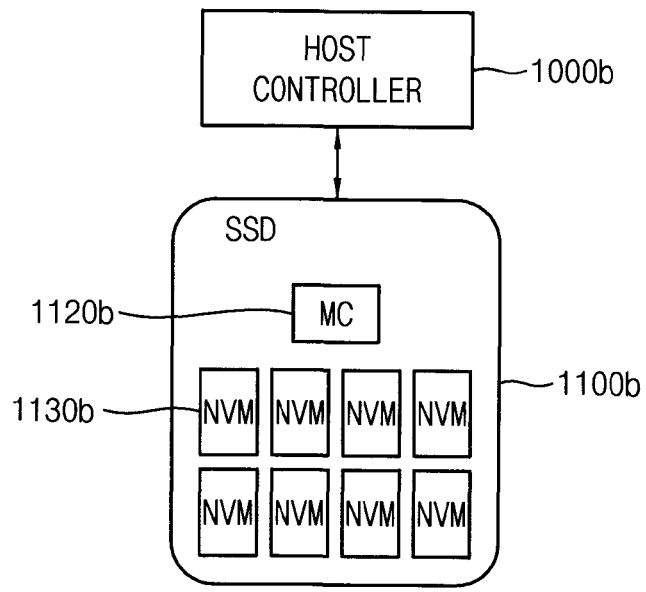
Figure 13C:
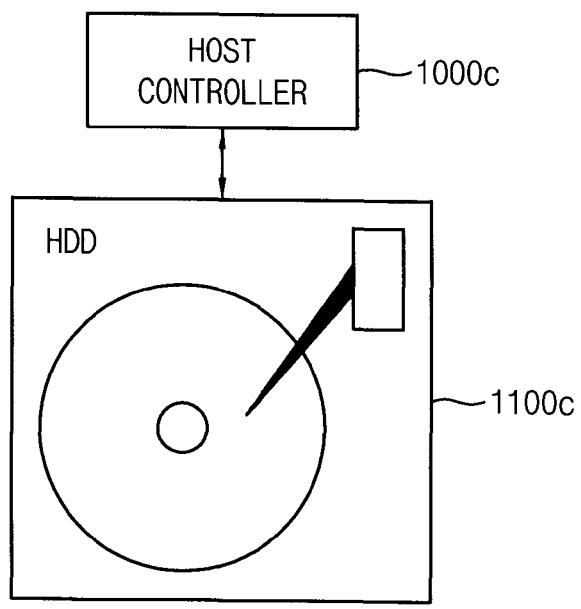

FIGS. 13A, 13B and 13C are block diagrams respectively illustrating examples of storage devices that may incorporate a host controller according to various embodiments of the inventive concept.

A host controller according to certain embodiments of the inventive concept may be used to control the operation of many different kinds of storage device, such as (e.g.,) a universal flash storage (UFS), a memory card, a solid stage drive (SSD), a hard disk drive (HDD), etc.

For example, as illustrated in FIG. 13A, a host controller 1000a may control a memory card 1100a. The memory card 1100a may include a plurality of connecting pins 1110a including a clock pin, a command pin, a data pin and/or a reset pin, a memory controller 1120a that communicates with the host controller 1000a, and a nonvolatile memory device 1130a. For example, the memory card 1100a may include a multimedia card (MMC), an embedded multimedia card (eMMC), a hybrid embedded multimedia card (hybrid eMMC), a secure digital (SD) card, a micro-SD card, a memory stick, an ID card, a personal computer memory card international association (PCMCIA) card, a chip card, a USB card, a smart card, a compact flash (CF) card, etc.

In another example, as illustrated in FIG. 13B, a host controller 1000b may control a solid state drive (SSD) 1100b. The SSD 1100b may include a memory controller 1120b that communicates with the host controller 1000b, and a plurality of nonvolatile memory devices 1130b.

In still another example, as illustrated in FIG. 13C, a host controller 1000c may control a hard disk drive (HSD) 1100c.

However, the host controller according to example embodiments may not be limited to control the storage devices 1100a, 1100b and 1100c illustrated in FIGS. 13A through 13C, and may control any storage device used in any computational system.

Certain embodiments of the inventive concept may be applied to a host controller that controls any storage device, such as a UFS, a memory card, an SSD, a HDD, or the like, and various devices or systems including the host controller. For example, embodiments of the inventive concept may be applied to various electronic devices, such as a mobile phone, a smart phone, a personal computer, a desktop computer, a laptop computer, a tablet computer, a server computer, a workstation, a music player, a personal digital assistants (PDA), a portable multimedia player (PMP), a digital television, a digital camera, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications fall within the scope of the inventive concept as defined in the following claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A host controller that receives a command from a processor and controls operation of a storage device in response to the command, the host controller comprising:
   a system memory interface that communicates with a system memory;
   a storage interface that communicates with the storage device; and
   a controller configured to extract file encryption information and disk encryption information from the command and control operation of an encryption unit,
      the encryption unit configured to receive data from the system memory via the system interface for storage in the storage device via the storage interface, and further configured in response to the file encryption information and the disk encryption information to selectively encrypt the data received from the system memory or not encrypt the data,
      wherein the encryption unit is configured to selectively encrypt the data using a file-encryption operation based on the file encryption information, a disk encryption operation based on the disk encryption information, or an encryption operation including both the file encryption operation and the disk encryption operation, and
      wherein the controller is configured to control the encryption unit to encrypt the data using the encryption operation including both the file encryption operation and the disk encryption operation when the file encryption information indicates that the file encryption operation is to be performed and the disk encryption information indicates that the disk encryption operation is to be performed.

2. The host controller of claim 1, wherein the controller is configured to control the encryption unit to not encrypt the data when the file encryption information indicates that the file encryption operation is not to be performed and the disk encryption information indicates that the disk encryption operation is not to be performed.

3. The host controller of claim 1, wherein the controller is configured to control the encryption unit to encrypt the data using only the file encryption operation when the file encryption information indicates that the file encryption operation is to be performed and the disk encryption information indicates that the disk encryption operation is not to be performed.

4. The host controller of claim 1, wherein the controller is configured to control the encryption unit to encrypt the data using only the disk encryption operation when the file encryption information indicates that the file encryption operation is not to be performed and the disk encryption information indicates that the disk encryption operation is to be performed.

5. The host controller of claim 1, wherein the command includes a physical region description table (PRDT) characterizing the data received from the system memory.

6. The host controller of claim 5, wherein the PRDT comprises:
   a data base address field indicating an address for the data received from the system memory;
   a data byte count field indicating a number of bytes of the data;
   a disk algorithm selector field indicating whether or not the disk encryption operation is to be performed; and
   a file algorithm selector field indicating whether or not the file encryption operation is to be performed.

7. The host controller of claim 6, wherein the disk algorithm selector field further indicates a type of encryption algorithm used during the disk encryption operation, and
   the file algorithm selector field further indicates a type of encryption algorithm used during the file encryption operation.

8. The host controller of claim 6, wherein the PRDT further comprises a disk key length (DKL) field indicating a length of an encryption key used during the disk encryption operation, and a disk initialization vector (Disk IV) field indicating an initialization vector used during the disk encryption operation.

9. The host controller of claim 6, wherein the PRDT comprises a file key length (FKL) field indicating a length of an encryption key used during the file encryption operation, a file initialization vector (File IV) field indicating an initialization vector used during the file encryption operation, a file encryption key field indicating an encryption key used during the file encryption operation, and a file tweak key field indicating a tweak key used during the file encryption operation.

10. A host controller that receives a command from a processor and controls operation of a storage device in response to the command, the host controller comprising:
    a system memory interface that communicates with a system memory;
    a storage interface that communicates with the storage device;
    a controller configured to extract file encryption information and disk encryption information from the command and control operation of an encryption unit,
       the encryption unit configured to receive data from the system memory via the system interface for storage in the storage device via the storage interface, and further configured in response to the file encryption information and the disk encryption information to selectively encrypt the data received from the system memory or not encrypt the data,
       wherein the encryption unit is configured to encrypt the data using at least one of a file encryption operation and a disk encryption operation, wherein the file encryption operation is based on the file encryption information and the disk encryption operation is based on the disk encryption information,
       the encryption unit comprises a first encryption engine configured to perform the file encryption operation or the disk encryption operation, a second encryption engine configured to perform the file encryption operation or the disk encryption operation, and a data path forming unit configured to form a data path between the system memory interface and the storage interface, and
       the first encryption engine and second encryption engine are connectable in series using the data path forming unit to perform the file encryption operation and the disk encryption operation, and
       wherein the controller is configured to control the encryption unit to encrypt the data using both the file encryption operation and the disk encryption operation when the file encryption information indicates that the file encryption operation is to be performed and the disk encryption information indicates that the disk encryption operation is to be performed.

11. The host controller of claim 10, wherein the controller is configured to control the encryption unit to encrypt the data using only the file encryption operation when the file encryption information indicates that the file encryption operation is to be performed and the disk encryption information indicates that the disk encryption operation is not to be performed, and the first encryption engine and second encryption engine are connected in parallel using the data path forming unit to perform the file encryption operation.

12. The host controller of claim 10, wherein the controller is configured to control the encryption unit to encrypt the data using only the disk encryption operation when the file encryption information indicates that the file encryption operation is not to be performed and the disk encryption information indicates that the disk encryption operation will be performed, and the first encryption engine and second encryption engine are connected in parallel using the data path forming unit to perform the disk encryption operation.

13. The host controller of claim 10, wherein the file encryption operation is first performed on the data using the first encryption engine to generate file-encrypted data, and the disk encryption operation is subsequently performed on the file-encrypted data using the second encryption engine.

14. The host controller of claim 10, wherein the disk encryption operation is first performed on the data using the first encryption engine to generate disk-encrypted data, and the file encryption operation is subsequently performed on the disk-encrypted data using the second encryption engine.

15. A system-on-chip comprising: a processor providing a command to a host controller that controls a storage device in response to the command, wherein the host controller comprises:

a system memory interface that communicates with a system memory;

a storage interface that communicates with the storage device; and a controller configured to extract file encryption information and disk encryption information from the command and control operation of an encryption unit;

the encryption unit configured to receive data from the system memory via the system interface for storage in the storage device via the storage interface, and further configured in response to the file encryption information and the disk encryption information to selectively encrypt the data received from the system memory or not encrypt the data, wherein the encryption unit is configured to selectively encrypt the data using a file encryption operation based on the file encryption information, a disk encryption operation based on the disk encryption information, or an encryption operation including both the file encryption operation and the disk encryption operation, and wherein the command includes a physical region description table (PRDT) characterizing the data received from the system memory, and the PRDT comprises a data base address field indicating an address for the data received from the system memory, a data byte count field indicating a number of bytes of the data, a disk algorithm selector field indicating whether or not the disk encryption operation is to be performed, and a file algorithm selector field indicating whether or not the file encryption operation is to be performed.

16. The system-on-chip of claim 15, wherein the disk algorithm selector field further indicates a type of encryption algorithm used during the disk encryption operation, and the file algorithm selector field further indicates a type of encryption algorithm used during the file encryption operation.

17. The system-on-chip of claim 15, wherein the storage device is one of a universal flash storage (UFS), a memory card, a solid state drive (SSD) and a hard disk drive (HDD).

* * * * *